US010437065B2

(12) United States Patent
Zhu et al.

(10) Patent No.: US 10,437,065 B2
(45) Date of Patent: Oct. 8, 2019

(54) IPD CORRECTION AND REPROJECTION FOR ACCURATE MIXED REALITY OBJECT PLACEMENT

(71) Applicant: MICROSOFT TECHNOLOGY LICENSING, LLC, Redmond, WA (US)

(72) Inventors: Youding Zhu, Sammamish, WA (US); Michael Bleyer, Seattle, WA (US); Denis Claude Pierre Demandolx, Bellevue, WA (US); Raymond Kirk Price, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/724,041

(22) Filed: Oct. 3, 2017

(65) Prior Publication Data

US 2019/0101758 A1    Apr. 4, 2019

(51) Int. Cl.
*G09G 5/00* (2006.01)
*G02B 27/01* (2006.01)
(Continued)

(52) U.S. Cl.
CPC ..... *G02B 27/0172* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 6,236,748 B1 * 5/2001 Iijima ................. H04N 13/239
382/154
2006/0250322 A1   11/2006 Hall et al.
(Continued)

FOREIGN PATENT DOCUMENTS

EP             2966863 A1      1/2016
WO    WO-2016174858 A1 * 11/2016 ......... G02B 27/0172

OTHER PUBLICATIONS

"Camera Images", Retrieved From <<https://web-beta.archive.org/web/20151019184124/https://developer.leapmotion.com/documentation/csharp/devguide/Leap_Images.html>>. Oct. 19, 2015, 8 Pages.
(Continued)

*Primary Examiner* — Lunyi Lao
*Assistant Examiner* — Kirk W Hermann
(74) *Attorney, Agent, or Firm* — Workman Nydegger

(57) ABSTRACT

Optimizations are provided for generating passthrough visualizations for Head Mounted Displays. The interpupil distance of a user wearing a head-mounted device is determined and a stereo camera pair with a left and right camera is used to capture raw images. The center-line perspectives of the images captured by the left camera have non-parallel alignments with respect to center-line perspectives of any images captured by the right camera. After the raw images are captured, various camera distortion corrections are applied to the images to create corrected images. Epipolar transforms are then applied to the corrected images to create transformed images having parallel center-line perspectives. Thereafter, a depth map is generated of the transformed images. Finally, left and right passthrough visualizations are generated and rendered by reprojecting the transformed left and right images.

21 Claims, 16 Drawing Sheets

(51) Int. Cl.
*G02B 27/00* (2006.01)
*G06T 3/00* (2006.01)

(52) U.S. Cl.
CPC .......... *G06T 3/00* (2013.01); *G02B 2027/011* (2013.01); *G02B 2027/014* (2013.01); *G02B 2027/0134* (2013.01); *G02B 2027/0138* (2013.01); *G02B 2027/0181* (2013.01)

(56) References Cited

U.S. PATENT DOCUMENTS

| | | | |
|---|---|---|---|
| 2011/0234584 A1 | 9/2011 | Endo | |
| 2013/0106692 A1* | 5/2013 | Maizels | G06F 3/011 345/156 |
| 2014/0125574 A1* | 5/2014 | Scavezze | G06F 21/31 345/156 |
| 2014/0160239 A1* | 6/2014 | Tian | H04N 7/152 348/43 |
| 2014/0198017 A1 | 7/2014 | Lamb et al. | |
| 2014/0267243 A1* | 9/2014 | Venkataraman | G06T 7/557 345/419 |
| 2014/0362446 A1 | 12/2014 | Bickerstaff et al. | |
| 2015/0109415 A1* | 4/2015 | Son | G01B 11/22 348/46 |
| 2016/0131902 A1* | 5/2016 | Ambrus | G02B 27/0093 345/156 |
| 2016/0180181 A1* | 6/2016 | Seo | G06T 7/593 348/46 |
| 2017/0227771 A1* | 8/2017 | Sverdrup | G02B 27/0172 |
| 2017/0287215 A1* | 10/2017 | Lalonde | G06T 19/006 |

OTHER PUBLICATIONS

"HTC Vive: Ultimate Tricks and Tips Guide", Retrieved From <<https://web-beta.archive.org/web/20160719024248/http:/www.ultravr.org:80/htc-vive-guide/>>, Jul. 19, 2016, 22 Pages.

Hua, et al., "A 3D integral imaging optical see-through head-mounted display", In Journal of Optics Express, vol. 22, Issue 11, May 28, 2014, pp. 13484-13491.

Moser, et al., "Evaluating Optical See-Through Head-Mounted Display Calibration via Frustum Visualization", In Proceedings of IEEE Virtual Reality Conference, Feb. 12, 2015, 1 Page.

McGarrity, et al., "A Method for Calibrating See-through Head-mounted Displays for AR", In Proceedings of the 2nd IEEE and ACM International Workshop on Augmented Reality, Oct. 20, 1999, pp. 75-84.

"International Search Report and Written Opinion Issued in PCT Application No. PCT/US2018/052770", dated Dec. 19, 2018, 12 Pages.

* cited by examiner

IPD CORRECTION AND REPROJECTION FOR ACCURATE MIXED REALITY OBJECT PLACEMENT

BACKGROUND

Virtual-reality computer systems have recently received significant interest because of their ability to create immersive experiences and environments for users. Many virtual-reality computer systems use one or more on-body devices, such as a head-mounted device ("HMD") to render a virtual environment to a user. Conventional virtual-reality systems completely obstruct the actual world and display only the virtual environment to the user through the HMD. As a result, a user is completely immersed within the virtual environment and may not be aware of his/her real-world surroundings.

Continued advances in hardware capabilities and rendering technologies have greatly increased the realism of virtual objects displayed within a virtual-reality environment. For example, in virtual-reality environments, virtual objects can be placed within the virtual world in such a way as to give the impression that the user is completely immersed in a new world as opposed to his/her actual environment. As the user moves around within the real world, the virtual-reality environment automatically updates so that the user is provided with the proper perspective and view of the virtual objects. This virtual-reality environment is often referred to as a computer-generated scene, or simply a "scene." As used herein, "virtual-reality environment," "computer-generated scene," or simply "scene" are interchangeable terms that relate to an experience in which virtual content is projected in a virtual environment.

As discussed earlier, a virtual-reality head-mounted device completely obstructs a user's ability to see his/her real-world environment. In some situations, however, it is desirable for the user to view his/her real-world environment while still wearing the head-mounted device. To address this need, some VR systems have been developed to generate a "passthrough" visualization of that user's real-world environment. This passthrough visualization is rendered on the HMD of the head-mounted device so the user can view his/her real-world environment without having to remove the head-mounted device. To that end, cameras mounted on the user's head-mounted device capture visualizations of the user's real-word surroundings, and those visualizations are then projected onto the HMD so the user can view the real world without having to take off the head-mounted device.

While some technologies are available for generating passthrough visualizations, the current technologies are seriously lacking. In particular, the current technology is very costly because it requires new hardware (i.e., cameras) to be installed on the head-mounted device to capture the user's real-world surroundings. Furthermore, the current technology fails to optimize its passthrough visualizations to maximize the user's comfort when perceiving those visualizations. To clarify, each user perceives his/her environment in a different manner due to differences in body composition (e.g., distance between a person's eyes). The current passthrough technology fails to account for these body composition differences when generating its passthrough visualizations. To summarize, while some passthrough technologies have been developed, these technologies fail to accommodate the needs of many users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to computer systems, hardware storage devices, and methods that provide improved passthrough visualizations for virtual reality (VR) devices. In some instances, the disclosed embodiments include capturing and reconstructing images captured by a head-mounted device (HMD) and processing those images in such a manner that they will match the perspective of the user who is wearing the HMD.

Some disclosed embodiments are directed to head-mounted devices (HMDs) that are configured to provide improved passthrough optics. Other embodiments are directed to methods for using the HMDs.

The disclosed HMDs include a stereo camera pair comprising a left camera and a right camera. The stereo camera pair is used to capture images of a surrounding environment. Notably, a center-line perspective of an image captured by the left camera has a non-parallel alignment with respect to a center-line perspective of an image captured by the right camera (i.e. the cameras are angled with respect to one another so that their fields of view are not parallel).

Some disclosed embodiments include determining an interpupil distance (IPD) of the user. Then, the left camera is used to capture a raw left image of the surrounding environment and the right camera is used to capture a raw right image of the surrounding environment. Next, camera distortion corrections are applied to the captured right/left raw images to generate a corrected left image and a corrected right image, respectively. Here, the corrected left image has a same center-line perspective as the raw left image, and the corrected right image has the same center-line perspective as the raw right image. Subsequently, the embodiments apply epipolar transforms to the corrected left and right images to generate a transformed left image and a transformed right image. As a result of these transforms, a center-line perspective of the transformed left image is parallel to a center-line perspective of the transformed right image. Next, a depth map is generated. The depth map is based on a combination of the transformed left and right images. Thereafter, a left passthrough visualization and a right passthrough visualization are generated by reprojecting the transformed left and right images. This reprojection is performed using a result obtained from the depth map. Further, this reprojection causes the transformed left image's center-line perspective to be in alignment with the user's left pupil and the transformed right image's center-line perspective to be in alignment with the user's right pupil.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the embodiments may be realized and obtained by means of the instruments and combinations particularly pointed out in the appended claims. Features of the present embodiments will become more fully apparent from the following description and appended claims, or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
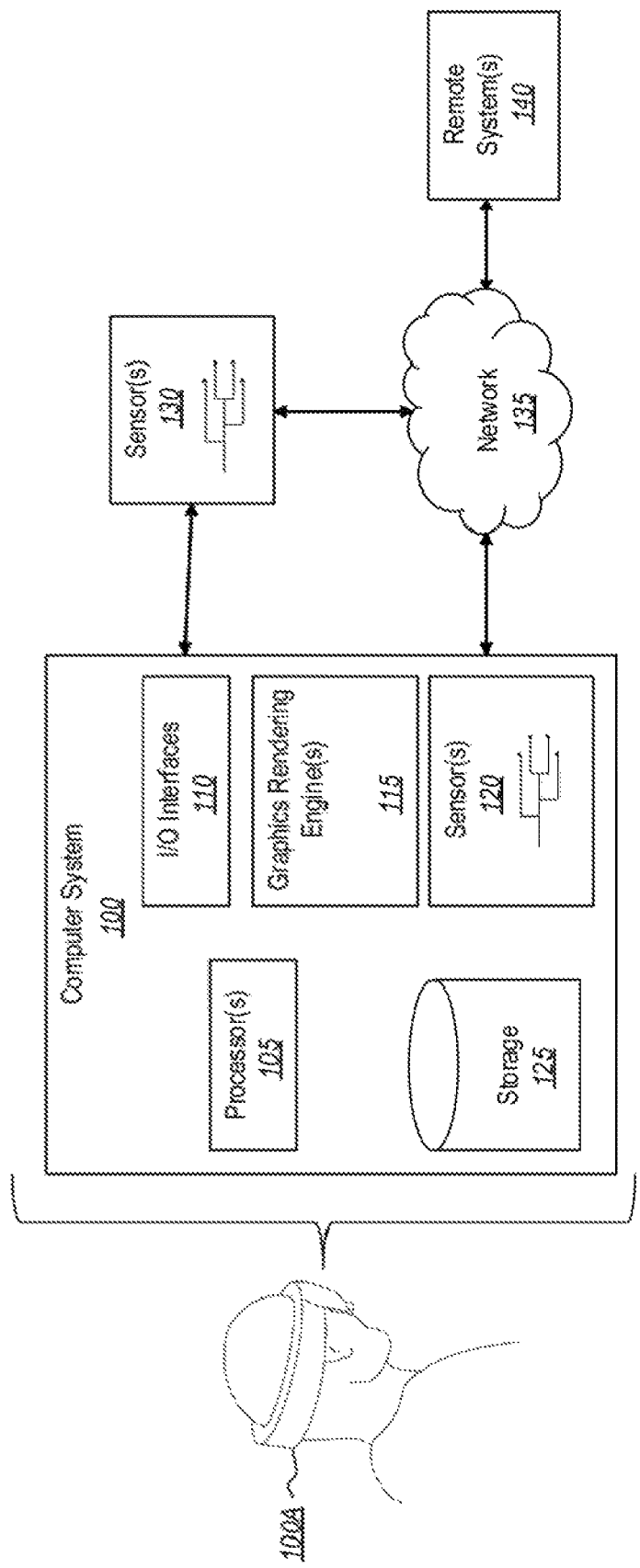
FIG. 1 illustrates an exemplary computer system.

Some disclosed embodiments are directed to computer systems, hardware storage devices, and methods for providing improved passthrough visualizations for virtual reality (VR) devices using images captured by head-tracking cameras mounted to the VR devices. Some embodiments include methods and devices for reconstructing a perspective captured in an image rendered on a VR head-mounted device (HMD) so that the captured perspective matches a perspective of a user who is wearing the HMD.

The present embodiments may be implemented to overcome many of the technical difficulties and computational expenses associated with generating a passthrough visualization. As discussed earlier, a passthrough visualization is a captured visualization of the user's real-world environment. This captured visualization is then displayed on a HMD so that the user can view his/her real-world surroundings without having to remove the head-mounted device. As a result, a visualization of the user's real-world surroundings "passes through" the cameras and is eventually displayed on the HMD.

The present embodiments significantly improve current passthrough technologies in a variety of ways. For example, some of the disclosed embodiments use existing hardware infrastructure (e.g., head tracking cameras), as opposed to installing new hardware, to generate the passthrough visualizations. Consequently, the current embodiments significantly reduce both production cost and user expense because less hardware is required. Similarly, because less hardware is placed on the head-mounted device, the user's comfort levels are also improved because the head-mounted device will be much lighter. As a result, the user will be able to wear the head-mounted device for longer periods of time without experiencing fatigue or strain.

The present embodiments also improve on current technologies by generating more advanced and custom perspective passthrough visualizations. As briefly discussed earlier, different people have different visual anatomy which enables each user to view the environment in a unique way. For instance, different people have different interpupil distances, which affect how each person views their environment. This will now be described in more detail.

Initially, it is noted that humans are able to perceive "depth" because humans have a pair of eyes that work in tandem. When both eyes are focused on an object, signals from the eyes are transmitted to the brain. The brain is then able to interpolate depth by using the disparities that exist between the two eye images. Notably, a person's depth perception ability is based (at least in part) on that person's interpupil distance (i.e. the distance between the person's two pupils). Because interpupil distance varies for each person, each person's process for viewing his/her surrounding environment is unique.

The disclosed embodiments utilize the user's interpupil distance (IPD) into the calculus of generating a passthrough visualization. Many existing passthrough technologies fail to consider and/or to accommodate different IPD for generating passthrough visualizations. The disclosed embodiments, in contrast, not only perform corrections to accommodate camera distortions but they also reconstruct/alter a perspective captured by a camera image so that the captured perspective matches the user's own unique perspective. Consequently, the embodiments significantly improve the quality of a passthrough visualization because the visualizations are customized for each user.

Disclosed embodiments also improve various functionalities and operations of the underlying computer systems used to perform the passthrough visualizations. By way of example, some traditional passthrough technologies require a great amount of computing resources because they perform operations on every pixel of a passthrough image, while some of the disclosed embodiments, in contrast, significantly reduce the amount of computing resources that are consumed because they operate using highly optimized images (e.g., images that have been down sampled and filtered). By way of example, one such optimization causes the image's pixels to be smooth in relation to one another. Consequently, the embodiments increase the computer's efficiency when generating a passthrough visualization.

In some embodiments, a HMD is configured with a stereo camera pair which comprises a left and right camera. The stereo camera pair is used to capture images of a surrounding environment, wherein a center-line perspective of an image captured by the left camera has a non-parallel alignment with respect to a center-line perspective of an image captured by the right camera (i.e. the cameras are angled with respect to one another so that their fields of view are not parallel). The left camera captures a raw left image of the surrounding environment and the right camera captures a raw right image of the surrounding environment. Camera distortion corrections are applied to the raw images to generate corrected left images and corrected right images, wherein the corrected left image has a same center-line perspective as the raw left image, and the corrected right image has the same center-line perspective as the raw right image. Subsequently, epipolar transforms are applied to the corrected left and right images to generate a transformed left image and a transformed right image. As a result of these transforms, a center-line perspective of the transformed left image is parallel to a center-line perspective of the transformed right image. Next, the embodiments generate a depth map that is based on a combination of the transformed left and right images. Thereafter, a left passthrough visualization and a right passthrough visualization are generated by reprojecting the transformed left and right images, based on the determined IPD of the user and the depth map. Further, this reprojection causes the transformed left image's center-line perspective to be in alignment with the user's left pupil and the transformed right image's center-line perspective to be in alignment with the user's right pupil.

Having just described various benefits and high-level attributes of the embodiments, the disclosure will now focus on FIG. 1 which presents an introductory discussion of an exemplary computer system. Following that discussion, various architectures and supporting illustrations will be discussed using FIGS. 2-15. Lastly, various flow diagrams and methods will be detailed with respect to the remaining figures (FIGS. 16-19).

Exemplary Computing Systems

As illustrated in FIG. 1, an exemplary computing system 100 may take various different forms. For example, in FIG. 1, the computer system 100 is depicted as including a HMD 100A. Although the computer system 100 may be embodied within the HMD 100A, the computer system 100 may also be a distributed system that includes one or more connected computing components/devices that are in communication with the HMD 100A. Accordingly, the computing system 100 may be embodied in any form and is not limited strictly to the depiction illustrated in FIG. 1. By way of example, the computer system 100 may include a desktop computer, a laptop, a tablet, a mobile phone, server, data center and/or any other computing system.

In its most basic configuration, the computer system 100 includes various different components. For example, FIG. 1 shows that computer system 100 includes at least one hardware processing unit 105, input/output (I/O) interfaces 110, graphics rendering engines 115, one or more sensors 120, and storage 125.

The storage 125 may be physical system memory, which may be volatile, non-volatile, or some combination of the two. The term "memory" may also be used herein to refer to non-volatile mass storage such as physical storage media. If the computing system 100 is distributed, the processing, memory, and/or storage capability may be distributed as well. As used herein, the term "executable module," "executable component," or even "component" can refer to software objects, routines, or methods that may be executed on the computing system 100. The different components, modules, engines, and services described herein may be implemented as objects or processors that execute on the computing system 100 (e.g. as separate threads).

The disclosed embodiments may comprise or utilize a special-purpose or general-purpose computer including computer hardware, such as, for example, one or more processors (such as processor 105) and system memory (such as storage 125), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 100 may also be connected (via a wired or wireless connection) to external sensors 130 (e.g., one or more remote cameras, accelerometers, gyroscopes, acoustic sensors, magnetometers, etc.). Further, the computer system 100 may also be connected through one or more wired or wireless networks 135 to remote systems(s) 140 that are configured to perform any of the processing described with regard to computer system 100.

During use, a user of the computer system 100 is able to perceive information (e.g., a virtual-reality scene) through a display screen that is included among the I/O interface(s) 110 and that is visible to the user. The I/O interface(s) 110 and sensors 120/130 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

In some instances, the positioning and movement of the user and the objects (both virtual and actual) are continuously monitored. This monitoring specifically detects any variation in the position and the movement of the objects, such as a detected change in position, velocity, orientation, or acceleration. These movements can be absolute movements and/or relative movements, such as compared to a relative positioning of the HMD, and such that movements/positioning of the HMD will be calculated into the relative movements/positioning of the objects as they are presented in the scene.

The graphics rendering engine 115 is configured, with the processor(s) 105, to render one or more virtual objects within the scene. As a result, the virtual objects accurately move in response to a movement of the user and/or in response to user input as the user interacts within the virtual scene.

A "network," like the network 135 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 135. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

As discussed above, computer systems are able to provide a broad variety of different functions. One such function includes facilitating the manner in which a user views passthrough content while wearing a head-mounted device. Accordingly, attention will now be directed to FIG. 2, which illustrates an example virtual environment.

Passthrough Visualizations

Figure 2:
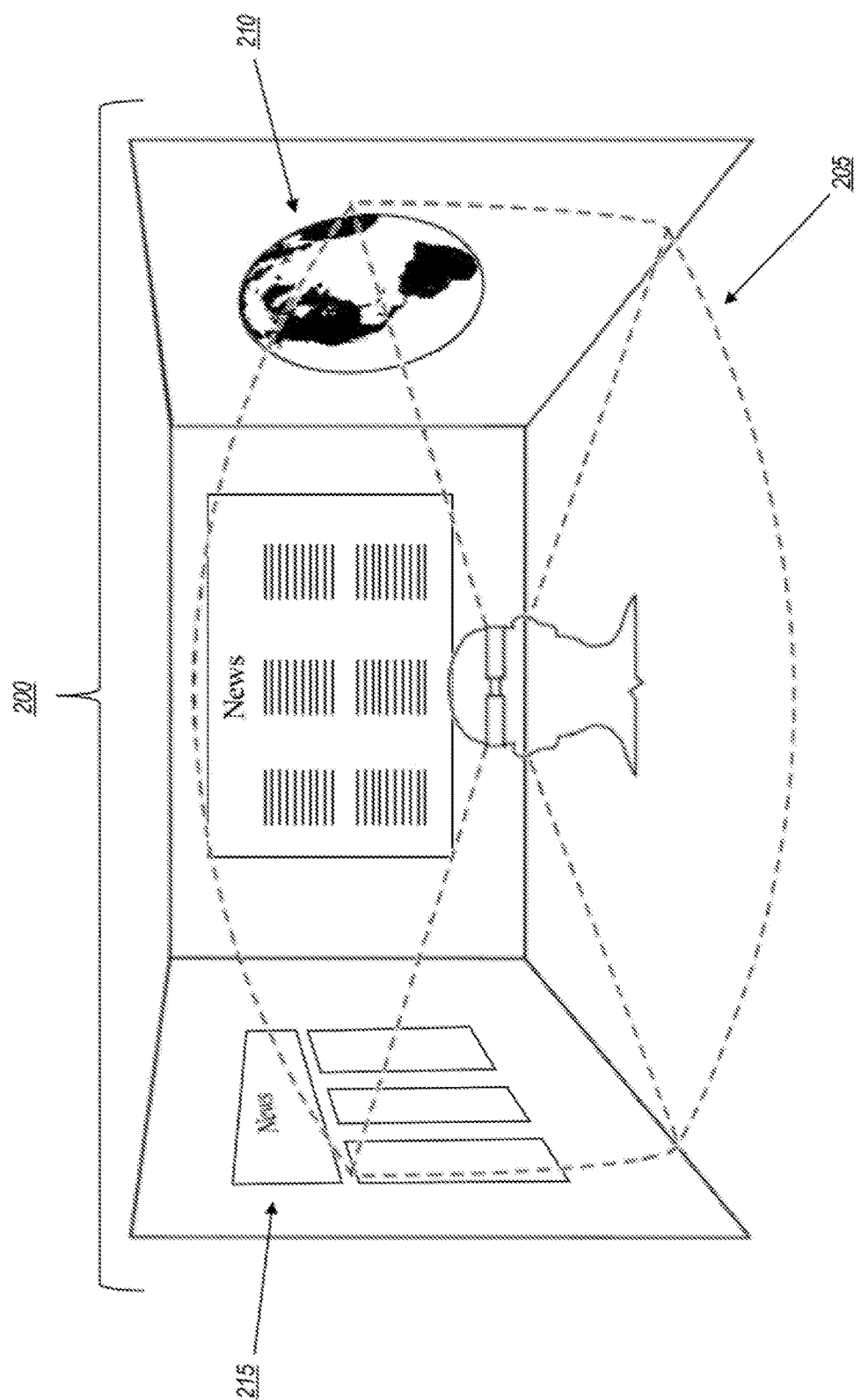
FIG. 2 illustrates an example virtual-reality environment.

FIG. 2 illustrates a virtual scene 200 as perceived within a user's field of view 205. To clarify, the virtual scene 200 includes different virtual content. Here, the virtual scene 200 includes a world content 210 and a news content 215. The virtual scene 200 may include additional content and is not limited simply to that which is depicted in FIG. 2.

When the user wears the virtual-reality HMD, that user is able to perceive a portion of the virtual scene 200 which is viewable based on the user's field of view 205. This field of view 205 may be influenced by different factors, including but not limited to the display area of the HMD. To clarify, in some instances, the display area of the HMD is limited due to a restricted availability of physical space on which virtual content may be projected. As a result, even though the virtual scene 200 might be very expansive, only portions of that virtual scene 200 are available to view at any particular time. Which portions are available to view is based at least in part on the orientation of the user. For example, as shown in FIG. 2, a portion of the world content 210 is beyond the user's field of view 205. If the user were to move his/her head to the right, additional content will be brought into view (e.g., new portions of the world content 210 will be viewable). However, while this movement will cause additional content to be brought into view, existing content (e.g., the news content 215) will be removed from the display.

As discussed earlier, it may be advantageous to allow the user to see his/her real-world environment through the HMD without having to take the HMD off. Such a situation is presented in FIGS. 3A and 3B.

Figure 3A:
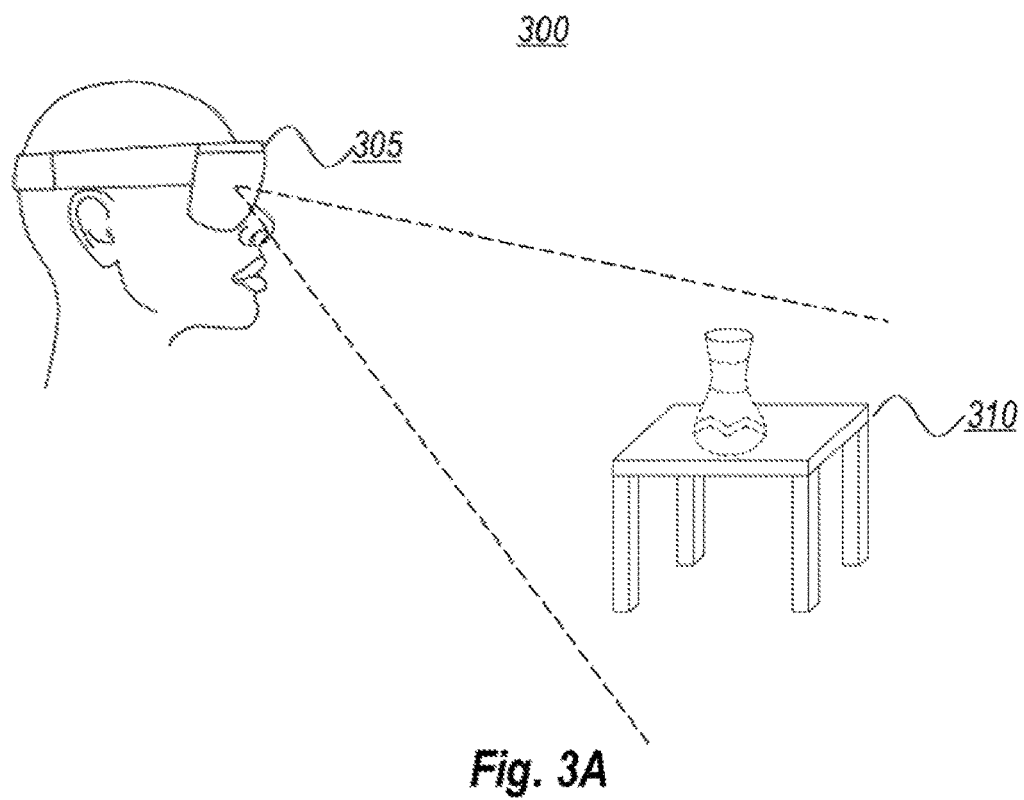
FIGS. 3A and 3B show a high-level illustration of a passthrough visualization.

In particular, FIG. 3A presents an example scenario 300 in which a user is wearing a head-mounted device 305. This head-mounted device 305 includes a HMD and is used to project virtual content. Stated differently, the head-mounted device 305 is used to immerse the user into a virtual-reality scene. While in this scene, the user may desire to view his/her real-world environment. In the scenario 300, the user's real-world environment includes one or more real-world objects 310 (e.g., the vase and the table). Because the head-mounted device 305 completely obscures a view of the real-world, these real-world objects 310 are not normally viewable by the user. However, by using the passthrough visualization embodiments discussed herein, visualizations of these real-world objects 310 may be rendered on the HMD for the user to view. Such a passthrough visualization is illustrated in FIG. 3B.

Figure 3B:
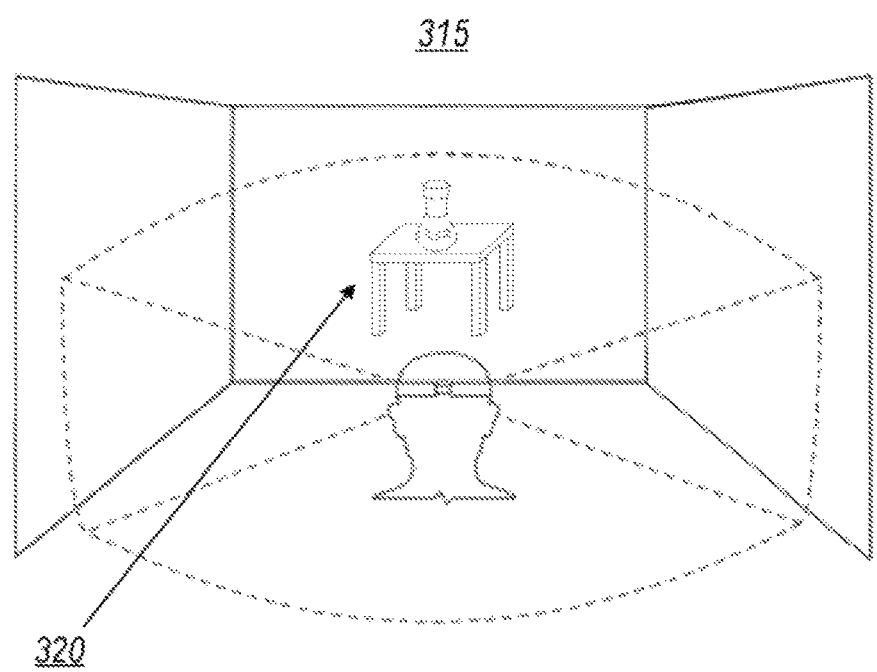

Specifically, FIG. 3B shows a scenario 315 where visualizations 320 of the real-world objects 310 are being rendered on the user's HMD. These visualizations 320 constitute "passthrough visualizations" because they are images of the real-world environment, and they are being rendered on the HMD. As shown, the user is able to view his/her real-world environment without having to remove the head-mounted device.

Figure 4:
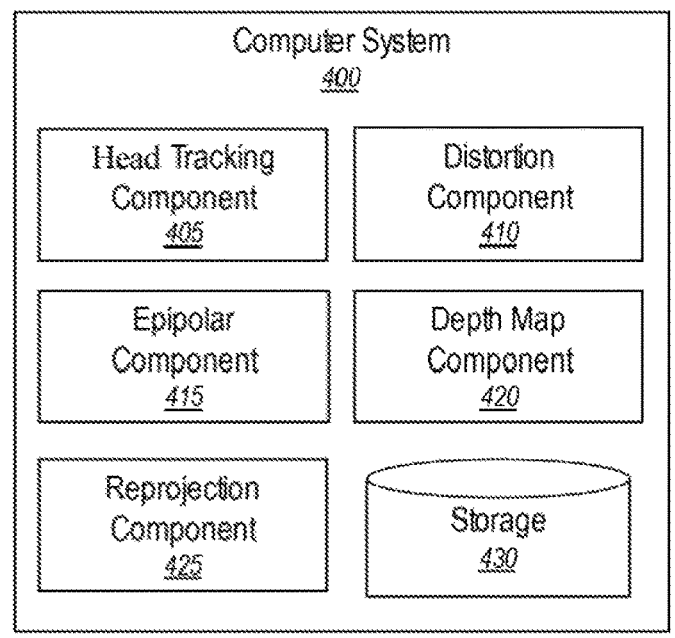
FIG. 4 depicts an exemplary computer system for generating passthrough visualizations.

Attention will now be directed to FIG. 4 which shows an exemplary computer system 400 configured to generate a passthrough visualization. Initially, it is noted that computer system 400 includes all of the features, functionalities, and abilities that were discussed in connection with the computer system 100 of FIG. 1.

As illustrated, computer system 400 includes a head tracking component 405, a distortion component 410, an epipolar component 415, a depth map component 420, a reprojection component 425, and storage 430. Together, these components operate to reconstruct a perspective captured by a camera image so that the captured perspective matches a perspective of the user. Worthwhile to note, the user's perspective is determined, at least in part, by the user's interpupil distance. Further detail will be provided on each of these computing components at a later time. Now, however, attention will be directed to FIG. 5.

Figure 5:
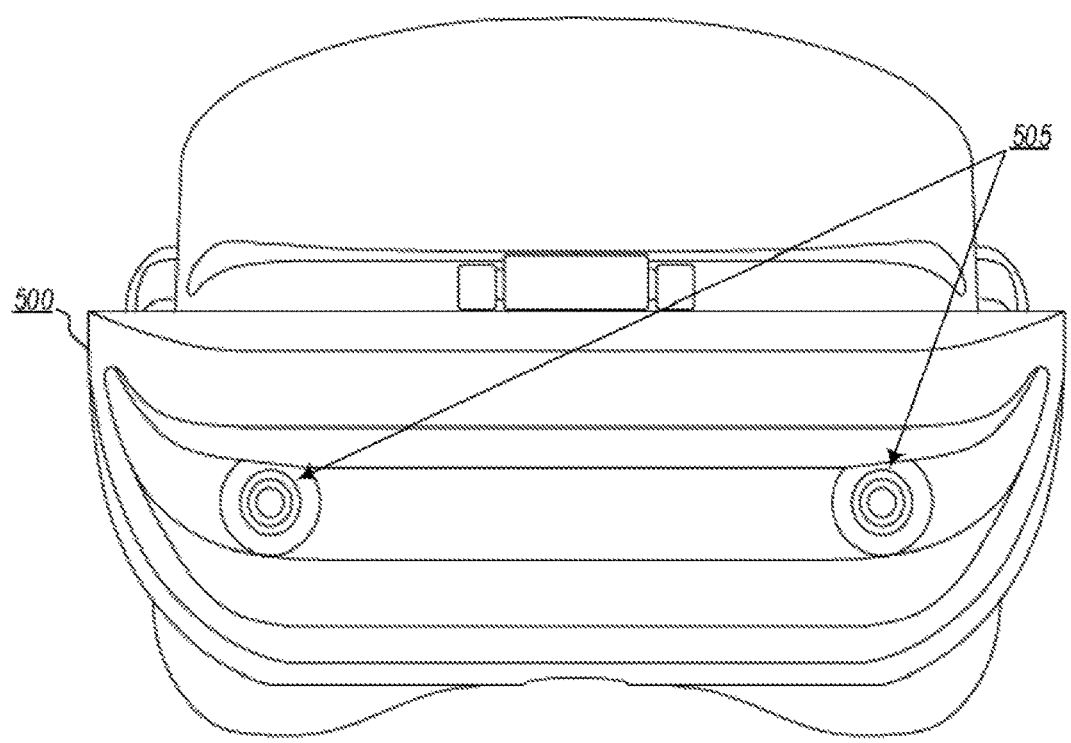
FIG. 5 shows an example of a head-mounted device that includes a stereo camera pair.

FIG. 5 shows an example head-mounted device 500 that is able to generate a virtual-reality scene. Here, the head-mounted device 500 is analogous to the head-mounted device 305 of FIG. 3. In this situation, however, the head-mounted device 500 includes at least two cameras 505. These two cameras 505 constitute a stereo (i.e. two) camera pair and are a part of an "inside-out" head tracking system.

An inside-out head tracking system tracks the position of a head-mounted device by monitoring the device's position in relation to its surrounding environment. This feat is accomplished through the use of tracking cameras that are mounted on the device itself and that are pointed away from the device. In contrast, an outside-in tracking schema uses cameras that are mounted in the environment and that are pointed toward the device. In this manner, inside-out head tracking systems are distinguished from outside-in head tracking systems.

Here, the two cameras 505 are mounted on the object being tracked (i.e. the head-mounted device) and are oriented away from the head-mounted device. Consequently, the two cameras 505 are a part of an inside-out head tracking system.

By using the two cameras 505, the head-mounted device 500 is able to interpolate its own position in relation to its surrounding environment. Further detail on these cameras is found in FIG. 6.

Figure 6:
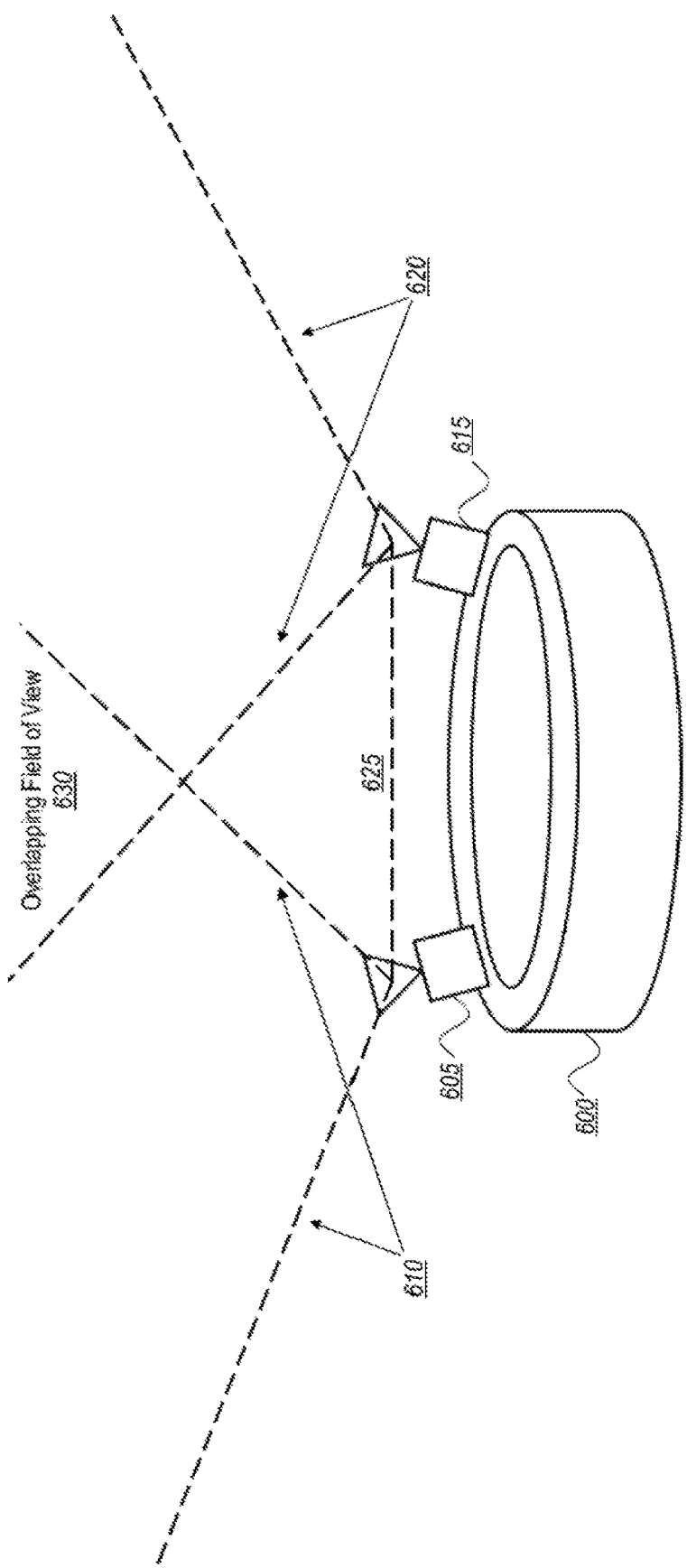
FIG. 6 illustrates a high-level overview of a stereo camera pair.

FIG. 6 presents an abstract view of an inside-out head tracking system. As shown, a head-mounted device 600 includes a stereo camera pair (i.e. the left camera 605 and the right camera 615). Here, the left camera 605 has a "field of view" 610. It will be appreciated that a camera's "field of view" is the amount of area that can be captured by the camera's lens and that is then included in a camera image. The left camera 605, in some instances, may be a wide-angle camera such that the field of view 610 is a wide-angle field of view.

Similar to the left camera 605, the right camera 615 also has a corresponding field of view 620. Furthermore, the right camera 615, in some instances, is a wide-angle camera. As also shown in FIG. 6, the field of view 610 and the field of view 620 include an overlapping region (i.e. overlapping FOV 630). Together, the left camera 605 and the right camera 615 are able to record the surrounding environment. Further, because of the overlapping FOV 630, the embodiments are able to perform depth determinations using the stereo camera pair (i.e. the left camera 605 and the right camera 615). Using these recordings, the head-mounted device 600 is able to determine its position within that environment. Additionally, these head-tracking/passthrough cameras (i.e. left camera 605 and right camera 615) may be wide-angle field of view cameras that overlap with a field of view of a user who is wearing the head mounted device.

To capture as much of the surrounding environment as possible, the left camera 605 and the right camera 615 are positioned apart, at a preselected distance 625 from each other, and are angled away from each other. This distance 625 may be any distance. Commonly, however, the distance 625 is usually at least 7 centimeters (cm). It will be appreciated that the distance 625 may more than 7 cm (e.g., 7.5 cm, 8.0 cm, 8.5 cm, 9.0 cm, 9.5 cm, 10.0 cm, 10.5 cm, 11.0 cm, 11.5, cm, 12.0 cm, 12.5 cm, etc.), or less than 7 cm. This distance between the stereo camera pair (i.e. left camera 605 and right camera 615) is the camera baseline (i.e. the distance 625) of at least 7 cm.

Here, it is worthwhile to note that typical humans have an interpupil distance in the 55 millimeter (mm) to 69 mm range. Because of this variation in range, discrepancies between the stereo camera's baseline and the user's interpupil distance may cause an inaccurate passthrough visualization to be generated. Stated differently, the depths of the real-world objects rendered in the visualization may not match how the user would perceive the depths of those objects if he/she were to view them directly. It will be appreciated that these incorrect depth determinations/calculations will result not only in false/inaccurate images but also in jarring and/or unpleasant experiences for the user. By following the principles presented by this disclosure, however, the user will not be faced with these problems.

Figure 7:
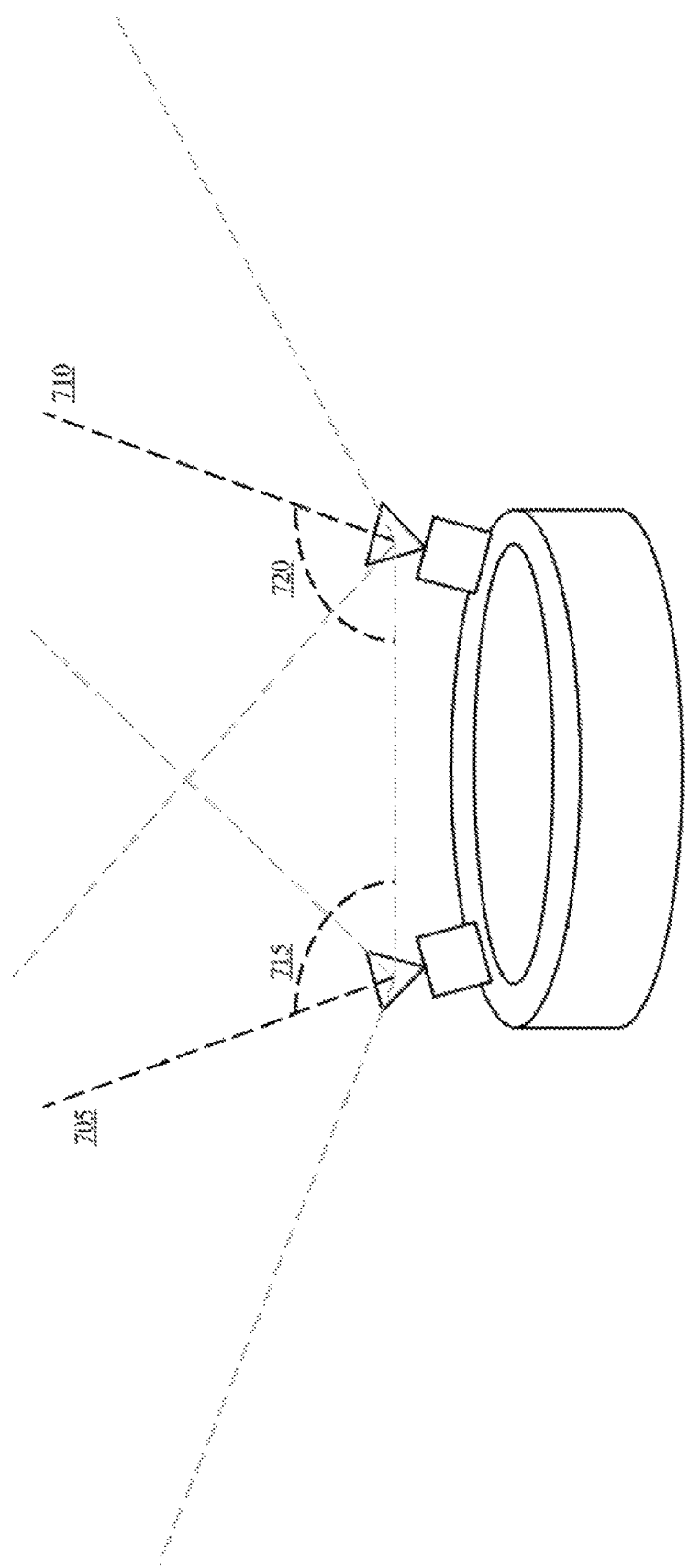
FIG. 7 illustrates another high-level overview of a stereo camera pair.

Attention will now be directed to FIG. 7. Initially, it is noted that some of the features from FIG. 6 are repeated in FIG. 7 so it is not necessary to repeat the labels.

Here, the left and right cameras are again shown as having a field of view. Now, however, the cameras are shown has having an additional feature, namely a "center-line perspective." In particular, the left camera has center-line perspective 705, and the right camera has center-line perspective 710. Previously, it was mentioned that a "field of view" is the amount of area that can be captured by the camera's lens and that is then included in a camera image. The corresponding "center-line perspective" is simply the most central portion of the camera's field of view. Stated differently, a "center-line perspective" is the direction where the camera is being aimed. In some instances, the range for the center line perspective is between 0 and 35 degrees (e.g., 0, 5, 10, 15, 20, 25, 30, and 35 degrees or some other value in between). Additionally, in some embodiments, the head-tracking cameras (e.g., the left camera 605 and the right camera 615 of FIG. 6) are tilted downward from the horizon to better match a human's natural FOV. In some instances, this downward tilt is within the range of 0 degrees down to −45 degrees (e.g., −5, −10, −15, −20, −25, −30, −35, −40, or −45 degrees).

FIG. 7 also shows that the center-line perspective 705 is not parallel to the center-line perspective 710. In other words, the two center-line perspectives are angled with respect to one another. This non-parallel alignment is illustrated by the angle 715 and the angle 720. It will be appreciated that the angles 715 and 720 may be any angle sufficient to cause the two center-line perspectives to not have a parallel alignment. For instance, the angles 715 and 720 may be above or below, but not equal to, 90 degrees (e.g., 70, 75, 80, 85, 88, 89, 91, 92, 95, 100, 105, 110, etc.). In other instances, the angles 715 and 720 may be within the range indicated earlier (i.e. 0 to 35 degrees).

Here, it is worthwhile to note that such a "non-parallel alignment" is advantageous for inside-out tracking systems because it allows the cameras to capture more area of the surrounding environment and to improve tracking capabilities. For instance, if more area is captured, then the inside-out tracking system can better determine its position. Regarding passthrough systems, however, such a non-parallel alignment introduces additional distortions that must be handled in order to generate an accurate passthrough visualization.

At this time, it is worthwhile to note that the current embodiments repurpose existing inside-out tracking system hardware to generate a passthrough visualization. Therefore, because some inside-out tracking systems angle their cameras in the manner shown in FIG. 7, the current embodiments can operate even when such a configuration is present (i.e. angled cameras). Here, it will be appreciated that the current embodiments improve the technology by repurposing, or rather "dual purposing" existing hardware. As a consequence, the current embodiments significantly reduce both the cost and weight of virtual-reality systems.

As indicated earlier, when the left and right cameras are dual purposed so that they also perform passthrough functionalities (in addition to normal inside-out tracking operations), certain optimizations must be performed. Disclosed embodiments advance the current technology by performing such optimizations.

Figure 8:
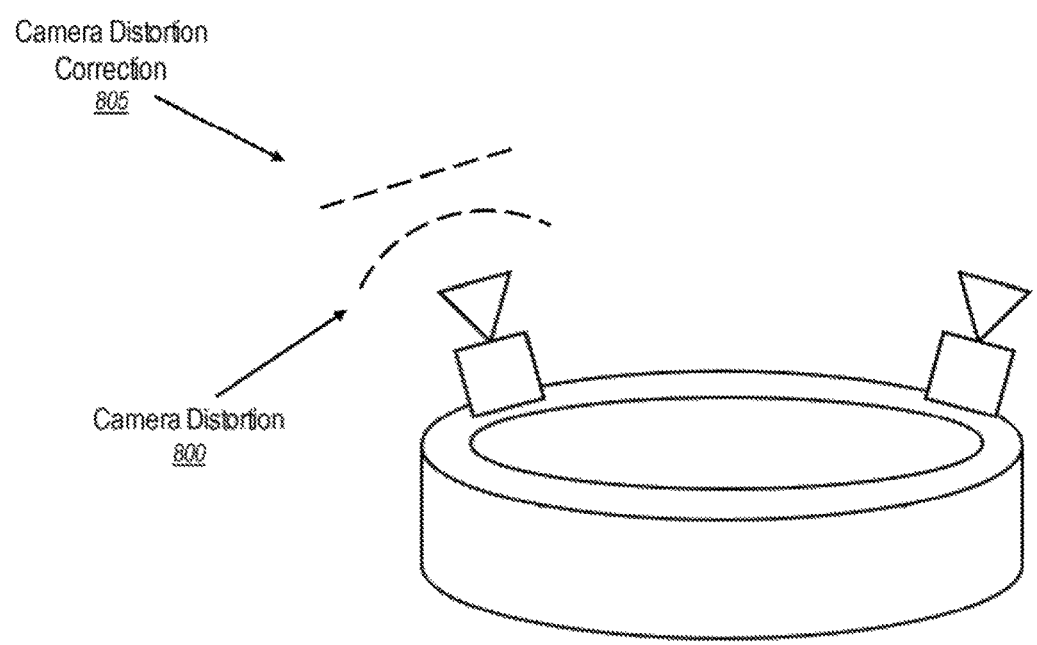
FIG. 8 demonstrates various operations to correct for camera distortion.

A first type of optimization is shown in FIG. 8 and is used to correct for the camera's own distortions.

In particular, FIG. 8 shows that a camera (i.e. the left camera) has a camera distortion 800. In some instances, the camera distortion 800 may be the result of various characteristics of the camera's lenses. By way of example and not limitation, a lens may have a convex shape, a concave shape, or some other kind of distorting shape (e.g., a wide-angle lens). Such distortions cause the resulting camera images to also have various distortions. Indeed, depending on the shape of the lens, the lens may produce curved lines when straight lines should have been produced or straight lines when curved lines should have been produced. In general, there are two primary types of lens distortions, namely, a barrel distortion and a pincushion distortion.

A barrel distortion occurs when straight lines are caused to bow, or bend, outward from a center portion of an image. Barrel distortion commonly occurs when a wide-angle camera lens is used. This type of distortion is more pronounced when an object is placed too closely to the wide-angle lens. When the object is so placed, the lens may cause that object's straight lines to appear to be severely bent outward. Such distortions will severely impact the depth of the object as it is perceived in a passthrough visualization.

In contrast to a barrel distortion, a pincushion distortion occurs when straight lines are pinched inward at a center portion of an image. Pincushion distortions may cause images to appear thinner than they actually are. As a result, both pincushion distortions and barrel distortions need to be corrected in order to allow objects to be accurately perceived in a passthrough visualization.

Other types of camera distortions include flare (i.e. undesired light reflections that are captured in an image), ghosts (i.e. a repeated number of undesired light reflections that are captured in an image), spherical aberrations (i.e. light differences that exist between center lines and edge lines), chromatic aberrations (i.e. color shifts that are similar to a prism light effect), coma aberrations (i.e. edge blurring), and astigmatisms (i.e. elliptical or linear shifts in an image). Based on the type of lens that is being used, one or more of these camera distortions may be present in the captured image.

Other types of camera distortions may relate to the camera's shutter speed, resolution, brightness abilities, intensity abilities, and/or exposure properties. While the above description detailed a few types of distortions that may be included among the camera distortion 800, it will be appreciated that other types of distortions may be present as well. Accordingly, at a high level, a camera may have one or more camera distortions 800.

The embodiments are configured to compensate for the one or more camera distortions 800. For example, as shown in FIG. 8, the embodiments are able to perform camera distortion corrections 805. Here, the camera distortion corrections 805 may include optimizations to correct for distortions related to barrel distortion, pincushion distortion, flare, ghosts, spherical aberrations, chromatic aberrations, coma aberrations, astigmatisms, shutter speed, resolution, brightness abilities, intensity abilities, and/or exposure properties. While the above description detailed a few corrections that may be applied, it will be appreciated that the present embodiments are able to correct for any type of camera distortion 800. Accordingly, the present embodiments are able to perform one or more camera distortion corrections 805 in an effort to generate an image that accurately reflects the real-world environment.

Figure 9:
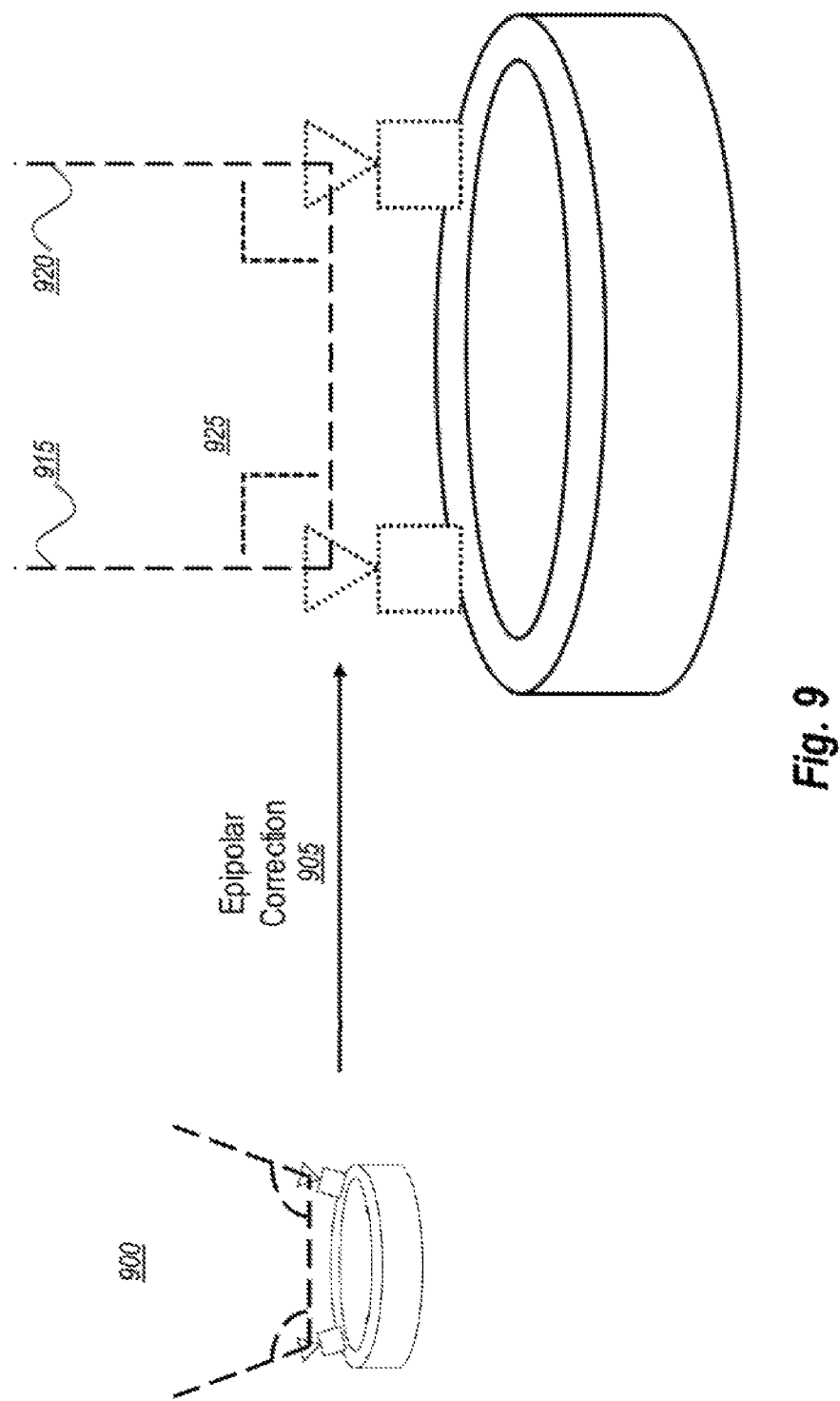
FIG. 9 illustrates an epipolar correction process that alters images captured by the stereo camera pair.

Having just described one type of optimization (i.e., camera distortion correction), attention will now be directed to FIG. 9 which illustrates another type of optimization (i.e., epipolar transform).

As discussed previously, the center-line perspectives of the two stereo cameras may not be aligned in a parallel manner. Indeed, FIG. 9 shows such a scenario 900 in which the left camera's center-line perspective is not parallel to the right camera's center-line perspective. Such a non-parallel alignment introduces distortions when the stereo camera pair is used to generate a passthrough visualization. To clarify, to be an accurate passthrough visualization (i.e. one without distortions), the center-line perspective of a left passthrough visualization should parallel a center-line perspective of the user's left eye. Similarly, to be an accurate passthrough visualization, the center-line perspective of a right passthrough visualization should parallel a center-line perspective of the user's right eye.

To correct for these distortions, the embodiments perform epipolar transforms 905 to the images captured by the left and right cameras. Here, the epipolar transform 905 alters/re-aligns the center-line perspective of an image captured by the left camera so that it is parallel to the center-line perspective of an image captured by the right camera. Such an alteration/re-alignment is shown in FIG. 9.

As shown, the epipolar transforms 905 alters/re-aligns the center-line perspective 915 of an image captured by the left camera so that it is now parallel to the center-line perspective 920 of an image captured by the right camera. This parallel nature is illustrated by the right angle 925. To clarify, as a result of the epipolar transforms 905, two new "transformed" images are generated. These two transformed images have center-line perspectives that are aligned to be parallel.

To perform the epipolar transforms 905, the embodiments perform one or more rotational transforms, translation transforms, and/or scaling transforms. These three types of transforms are examples of two-dimensional transforms in which an underlying canvas bitmap is altered so that a new, transformed image is generated. Rotational transforms, translation transforms, and scaling transforms are generally known in the art and will not be discussed in depth in this disclosure.

Figure 10:
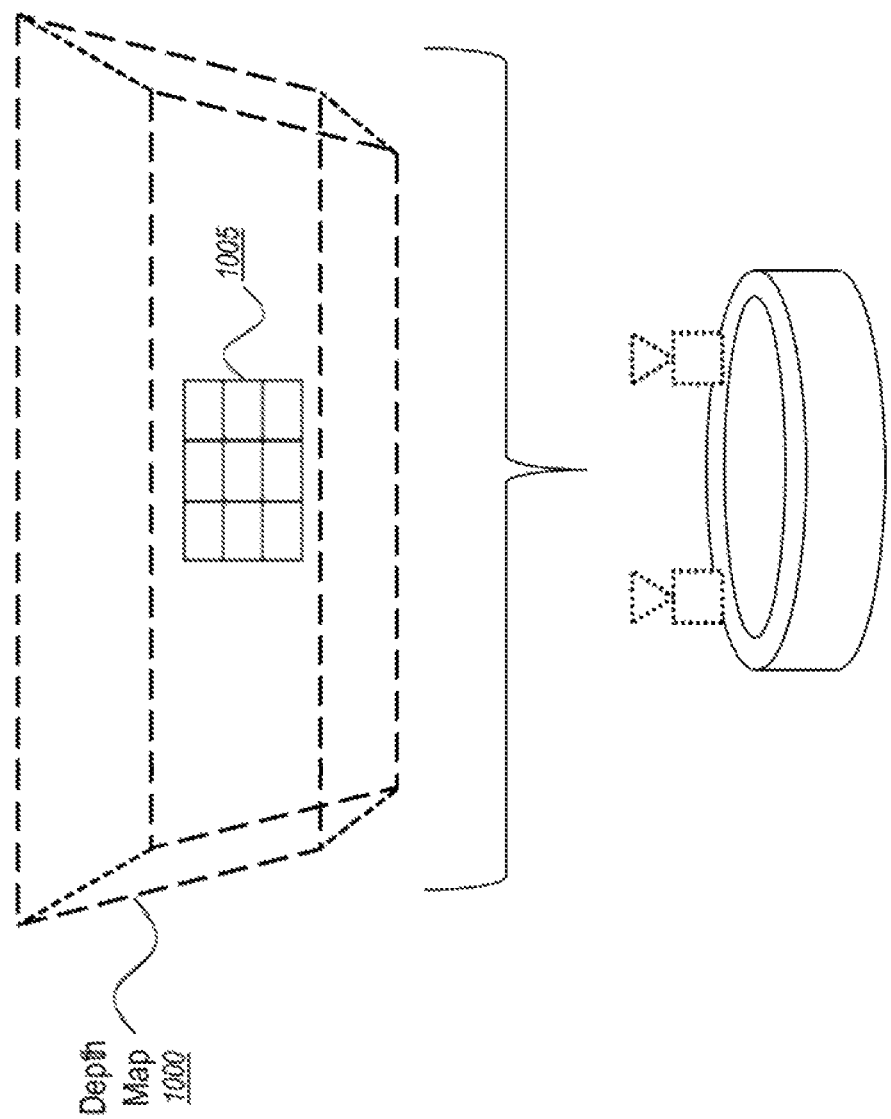
FIG. 10 illustrates an example of a depth map.

After the camera distortion corrections 805 of FIG. 8 and the epipolar transforms 905 of FIG. 9 are performed, the embodiments then generate a depth map, as shown in FIG. 10.

In particular, FIG. 10 shows a resulting depth map 1000. This depth map is comprised of a plurality of three-dimensional coordinates 1005, where each three-dimensional coordinate corresponds to a single pixel included within a plurality of pixels that together form a particular image. This particular image is generated by combining together (1) a left image that has undergone both a camera distortion correction and an epipolar transform and (2) a right image that has undergone both a camera distortion correction and an epipolar transform. As a consequence, the depth map 1000 maps distances between the stereo camera pair and objects that are located in the surrounding environment.

It will be appreciated that the depth map 1000 can be considered as a disparity estimation. Just like how a human perceives depth by analyzing the disparity between a vision captured by a left eye and a vision captured by a right eye, image depth may be computed by analyzing and estimating the disparity present between two camera images. The depth map may include pixel depth coordinates and/or depth transform data used to identify the relative depth of each pixel rendered in the passthrough visualizations. In some embodiments, the depth map is a partial depth map that only includes a limited set of pixel depth data, rather depth data for all pixels.

The embodiments estimate depth by computing the disparity (i.e. the observed displacement) for corresponding pixels in the captured images. Because two observing sources (i.e. cameras) are involved (just like the scenario in which a user uses both eyes to observe the displacement), a disparity value can be computed for each and every pixel in an image. By way of example, suppose a person were to look at her finger with both eyes. If she were to close one eye while looking at the finger and then open that eye while closing the other, that person will be able to observe a displacement in the location of her finger. If the finger is closely positioned to the person's eyes, then the observed displacement is large. If the finger is far from the person's eyes, however, then the observed displacement is small. Accordingly, the observed displacement is inversely proportional to distance from an observing source (e.g., an eye). Using this disparity between the two offset cameras, the embodiments are then able to calculate a corresponding depth for each captured pixel. As a result, a three-dimensional model (i.e. the depth map 1000) can then be generated to map the three-dimensional coordinates for each pixel (or a subset of pixels) in a particular image.

Figure 11:
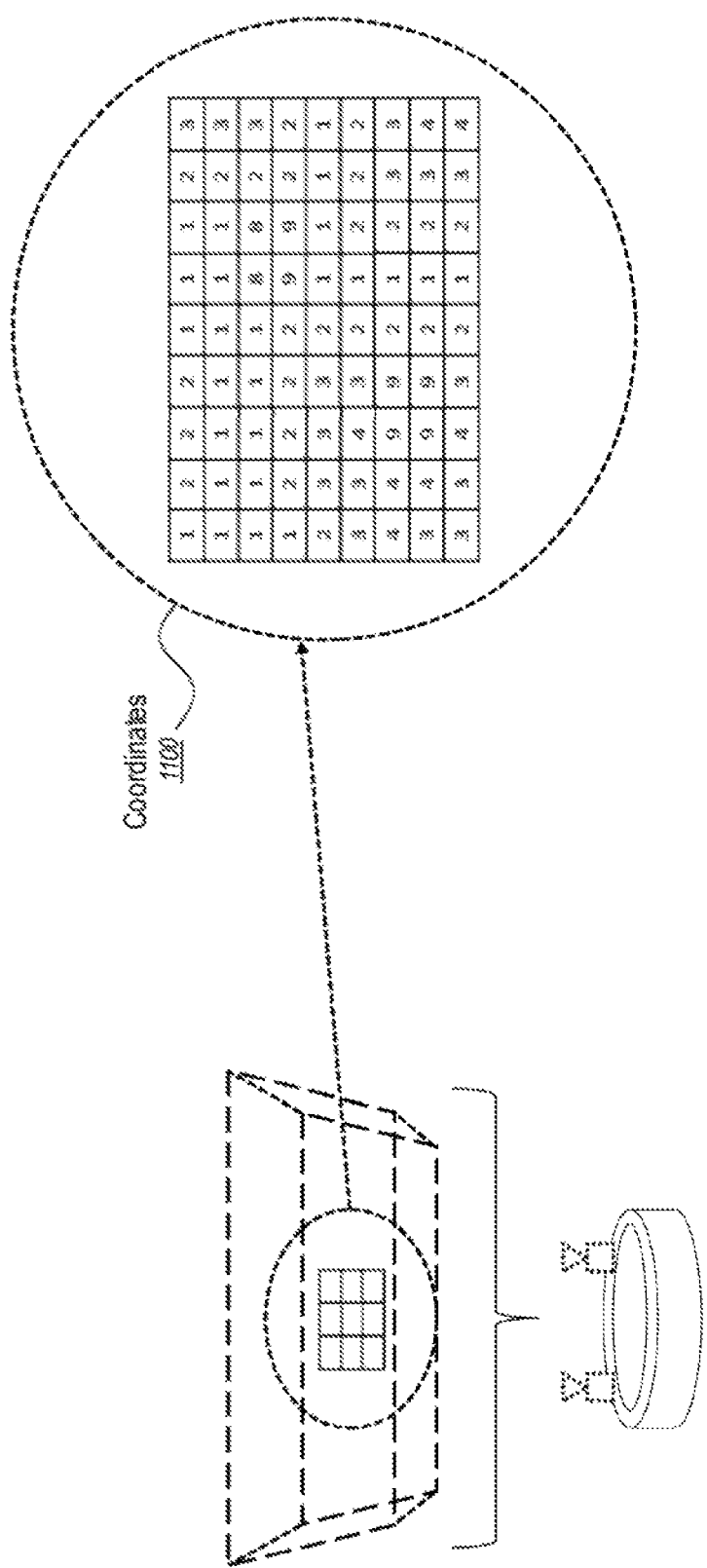
FIG. 11 illustrates another example of a depth map.

FIG. 11 shows another example of the depth map of FIG. 10 (because FIG. 11 is similar to FIG. 10, no labels are necessary for the similar items). In particular, FIG. 11 shows various individualized three-dimensional coordinates 1100 that are included in the depth map. As discussed above, the depth map's three-dimensional coordinates at least portray a depth value of an image's pixels. By way of illustration, some of the individualized three-dimensional coordinates 1100 have example coordinate values of 1, 2, 3, 4, 8, and 9. These values are used for illustration purposes only and should not be considered as actual values. Accordingly, the illustration shown in FIG. 11 is simply an example and should not be considered as limitations on the embodiments.

In an effort to reduce the amount of computing resources that are used when working with or generating the depth map, some embodiments downscale the left and right images before the depth map is generated. Additionally, some embodiments also filter the depth map to remove some of the three-dimensional coordinate values. By downscaling the images and filtering the depth map, the embodiments create a so-called "smooth" depth map by performing the temporal smoothing actions of filtering and downscaling.

Downscaling the left and right images may be performed at any time prior to when the depth map is generated. For example, the downscaling may occur immediately after raw images of the environment are captured by the cameras. Alternatively, the downscaling may occur after the camera distortion corrections are performed on the images. Even further, the downscaling may occur after the epipolar transforms are performed on the images. Regardless of when the downscaling occurs, the downscaling creates images that have a lower resolution. Because of this lower resolution, less computing resources are required to generate or work with the depth map (because the depth map is generated by an image that is formed from a combination of the left image and the right image).

In addition to downscaling, the depth map itself may also be filtered to reduce noise. Indeed, FIG. 12 shows an example scenario in which the depth map has been filtered.

Figure 12:
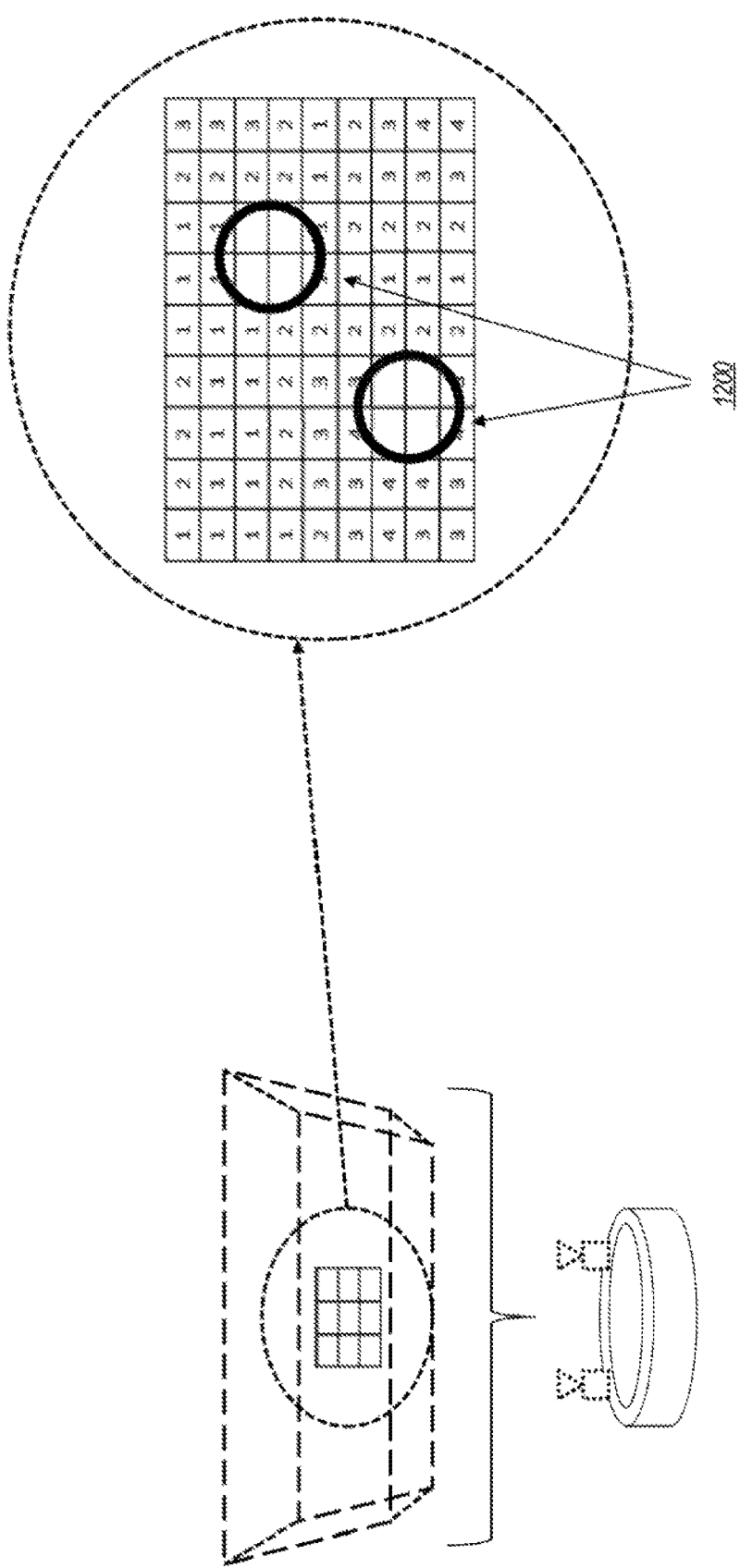
FIG. 12 demonstrates various filtering and down sampling operations.

As shown in FIG. 12, some of the three-dimensional coordinates have been filtered out. For example, some three-dimensional coordinates 1200 (e.g., those coordinates having a value of "8" or "9") have been removed from the depth map. Because of the filtering operation (and/or downscaling), a "smooth" depth map is created because it has less noise.

Noise in the depth map can adversely impact the user's experience. Noise is present when there is a large disparity in coordinate values between neighboring pixels. By way of example, the three-dimensional coordinates 1100 include some coordinates having a value of "9" that are immediately adjacent to coordinates having a value of "1." The difference between 9 and 1 is a large disparity and will show up as noise in the resulting passthrough visualizations. It will be appreciated that the values 9 and 1 (and the difference/disparity between 9 and 1) are examples only and should not be construed as limiting features.

Consequently, it is advantageous to filter out any potential noise. If noise is present in the depth map, then any resulting passthrough image may be subject to a phenomenon referred to herein as "flickering." Flickering occurs when neighboring (i.e. adjacent) pixels do not have similar depth coordinate values. These dissimilarities in depth coordinate values cause the pixels (which represent objects) in the passthrough visualizations to have vastly different depths. As a consequence, the objects "flicker." Stated differently, these differences in depth cause blatantly obvious distortions in the quality of the passthrough visualizations. In order to improve the quality and realism of the passthrough visualizations, the embodiments filter out neighboring coordinates that do not share a similar depth values. "Similar," in this connotation, means that the coordinate values of the neighboring pixels are within a particular threshold value of each other. It will also be appreciated that when those coordinates are filtered out of the depth map, new coordinates may be inserted in their place. These new coordinates would satisfy the particular threshold requirement. Accordingly, some embodiments replace the filtered coordinates with selected coordinates that satisfy the threshold requirement.

An additional example will be helpful. As illustrated, some of the three-dimensional coordinates 1100 in FIG. 11 have values of "1," "2," "3," "4," "8," and "9." Furthermore, some of the "9" coordinates are immediately adjacent to "1" coordinates, "2" coordinates, "3" coordinates, and/or "4"

coordinates. Relatedly, some of the "8" coordinates are placed in similar situations. Because there is a large depth difference between a "1" coordinate and a "9" coordinate, the resulting passthrough images will portray depth flickering (i.e. an object is rendered as having multiple obviously disparate depths). Such a phenomenon is undesirable. Accordingly, as shown in FIG. 12, the "8" coordinates and the "9" coordinates (which neighbor, or rather are "next to," lower value coordinates such that the threshold requirement for neighboring coordinates is not satisfied) have been filtered out of the depth map. These coordinates were filtered because they were too closely positioned to coordinates that had much lower depth values. In some instances, after being filtered, the embodiments may insert new coordinates in place of the filtered coordinates. These new coordinates will be selected so that the threshold requirement is satisfied. As a result, a smooth depth map is generated.

While smoothing the depth map, some embodiments analyze the depth map to identify a group of neighboring coordinates associated with corresponding pixels. After identifying this group of neighboring coordinates, determination is made whether all of the neighboring coordinates in that group are within a particular "depth threshold value" or standard of deviation to one another. If some of the coordinates are not within that particular depth threshold, then those coordinates are filtered out (and perhaps even replaced by new coordinate values). As a result, the embodiments remove noise and prevent flickering. It will be appreciated that the depth threshold is a predetermined value. In some instances, it is also adjustable, or rather configurable.

After generating the depth map, the left and right images, which were previously transformed and corrected, are reprojected so that a center-line perspective of the left image aligns with the user's left pupil and a center-line perspective of the right image aligns with the user's right pupil. This reprojection operation is illustrated in FIG. 13.

Figure 13:
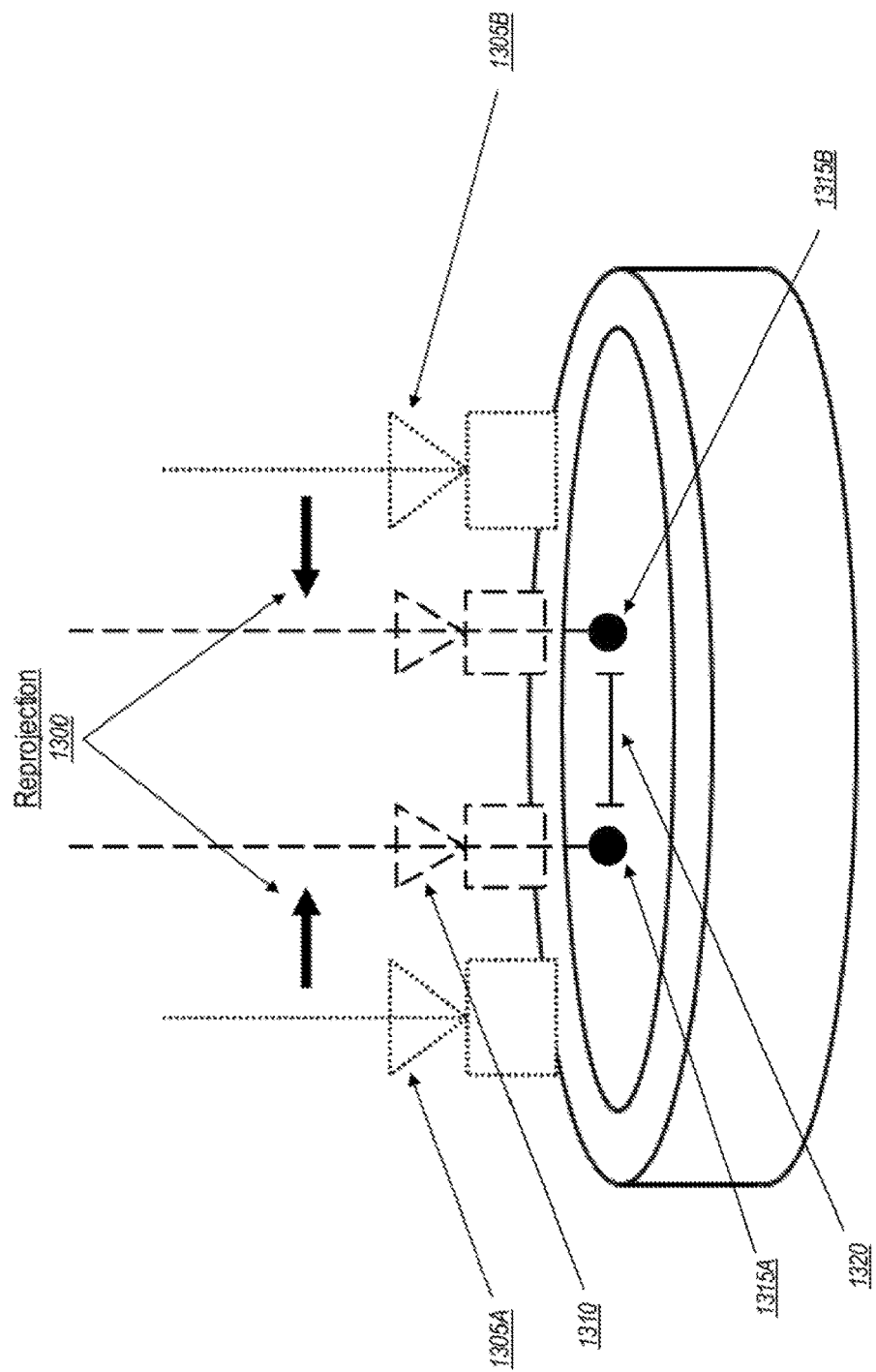
FIG. 13 demonstrates a reprojection process.

In particular, FIG. 13 shows a reprojection operation 1300. Prior to this reprojection operation 1300, various processes have been performed: (1) determining an interpupil distance of the user, (2) capturing left and right camera images of the surrounding environment, (3) applying camera distortion corrections to the raw camera images to thereby create corrected left and right images, (4) applying epipolar transforms to the corrected left and right images, thereby generating transformed left and right images, and (5) generating a depth map by combining the transformed left and right images (which may include smoothing). Downsampling may also be applied prior to the depth map generation.

As will be discussed later, the camera reprojection takes a dependency on measuring the user's IPD distance. Briefly, measuring the user's IPD may be performed by one or more of the following methods: direct observation of the eyes with an eye-facing camera, observation of glints from an LED array off the eye, mechanical estimation due to placement of the display with respect to the user's head (i.e. a mechanical sensor that detects where the user places the display and lens on his/her head), or through external measurement and direct entry by the user.

Although many optimizations and corrections have been performed up to this point, the transformed left and right images are still not yet ready to be displayed as passthrough images. Here, it is worthwhile to reflect on the discussion presented earlier. Notably, it was mentioned that the stereo cameras have a baseline of at least 7 cm. In other words, the left camera is at least 7 cm distant from the right camera. However, as mentioned earlier, most humans have an interpupil distance that is within the range of 55 mm to 69 mm. Because the baseline of the stereo cameras (i.e. the distance between the left camera and the right camera) is much larger than the baseline of a human's eyes (i.e. the interpupil distance), the resulting images (after performing the five operations discussed above) will still look distorted to the user. As a result, it is necessary to "reproject" the images to reflect a perspective that matches the perspective of the user, which user perspective is influenced by the user's interpupil distance. Accordingly, the embodiments reproject the transformed left and right images.

In essence, a reprojection operation essentially alters an image so that it appears as though the image was captured by a camera that was placed in a different position. This action is illustrated in FIG. 13.

FIG. 13 shows a left camera 1305A. As indicated earlier, optimizations were performed on the images captured by this left camera 1305A to correct for a camera distortion. Further, epipolar transforms were performed on the images captured by this left camera 1305A. Whereas the left camera 1305A is actually angled outward (as shown by the left camera 605 in FIG. 6), when the epipolar transforms were applied to the left camera 1305A's images, the epipolar transforms caused the center-line perspective of the left camera 1305A's image to be parallel to the right image's center-line perspective.

In other words, the epipolar transforms caused the left camera 1305A's images to appear as if they were captured by a camera that was aligned in parallel with the right camera. Accordingly, to reflect that epipolar transforms have already been applied to the images captured by the left camera 1305A, the left camera 1305A is illustrated as a dashed object. In actuality, however, the left camera 1305A is angled outward, just like the left camera 605 of FIG. 6.

By performing a reprojection operation 1300, the images captured by the left camera 1305A are altered. In particular, the images are altered in such a manner so that it appears as though the camera was actually located at a different position. This different position corresponds to the user's pupil locations 1315A and 1315B. To clarify, pupil location 1315A corresponds to a location of the user's left pupil while pupil location 1315B corresponds to a location of the user's right pupil. The distance 1320 corresponds to the user's interpupil distance (i.e. the distance between the pupil location 1315A and the pupil location 1315B). In essence, the images captured by the left camera 1305A are altered so that they appear as though they were actually captured by a camera (i.e. the "simulated," or rather "reprojected," left camera 1310) that was located near (i.e. a predetermined distance from, or rather in front of) pupil location 1315A.

In some instances, the reprojected left camera 1310 is aligned with a center-line perspective of the user's left pupil (similar processes are performed for the right camera and right pupil). Accordingly, the reprojection operation 1300 alters a camera's images so that it appears as though the images were captured by a camera located at a different position. This reprojection operation 1300 corrects for the distortions that are present due to depth disparities resulting from differences in the distance between a user's pupils. Similar reprojection operations are performed on the right camera 1305B. As a result, every dimension point (i.e. pixel) included in both the transformed left image and the transformed right image lies on a same horizontal scale. To clarify, all of the pixels in the transformed left image lie on the same horizontal scale as all of the pixels in the transformed right image, which facilitates the generation of the depth map by searching the transformed left image and the transformed right image to identify corresponding pixels. In particular, because the pixels all lie in the same horizontal scale, this search is performed only in a horizontal direction (i.e. a one-dimensional search). Furthermore, because this only involves a one-dimensional search, the search consumes few computer resources and is performed very quickly.

As shown in FIG. 13, it is desirable to select a location for the new "reprojected" left camera 1310 (and the corresponding reprojected right camera which is shown but not labeled). As discussed, these locations are selected based on the locations of the user's pupils. Accordingly, the disclosure will now present a series of equations that are used to determine the location for the "reprojected" cameras. It will be appreciated that the cameras are not actually being moved. Instead, new images are being created in such a manner that the images appear as though they were captured by a camera situated at the new position described above.

The first equation illustrated below establishes a relationship between the left camera 1305A, the reprojected left camera 1310, the right camera 1305B, and the left pupil location 1315A.

$$\lambda \in [0,1]$$

Where "λ" is the ratio between (1) the left camera 1305A and the left pupil location 1315A and (2) the left camera 1305A and the right camera 1305B. If "λ" is "0," then the reprojected left camera 1310 will be positioned at the same location as the left camera 1305A. If "λ" is "1," then the reprojected left camera 1310 will be positioned at the same location as the right camera 1305B. Accordingly, "λ" for the reprojected left camera 1310 will be some value between 0 and 1 as demonstrated by the equation presented above. Later, "λ" will be used to generate the resulting location for the reprojected left camera 1310 (i.e. an image is generated in which it appears as though the image was captured by a camera positioned at the resulting location described above).

The second equation, which is shown below, is used to determine the resulting location of the reprojected left camera 1310. To clarify, various operations are performed on the camera images. These operations alter the center-line perspective of the captured images. For example, during the initial image capture, the cameras were oriented at angles with respect to one another. As a consequence, the center-line perspectives were not in parallel with one another. In order to generate a user-friendly passthrough visualization, however, it is desired to alter the center-line perspectives so that the center-line perspectives match the user's perspective, which is determined by the user's pupil locations and distances. As clarified earlier, while the disclosure makes reference to "resulting location of the reprojected" cameras (or camera image), the physical location of the cameras is not being altered. Instead, various transformations are being imputed onto the image data to make it seem as though the image data was captured by a camera situated at a different location than where it actually is. Accordingly, the following equation is used to select the location of the resulting reprojected camera (or camera image).

$$C_{syn}(\lambda)=(1-\lambda)*C_L+\lambda*C_R$$

Where $C_{syn}$ is the resulting location for the reprojected left camera 1310, $C_L$ is the actual position of the left camera 1305A, and $C_R$ is the actual position of the right camera 1305B. λ was defined earlier. To summarize, this equation is used to select the resulting location of the reprojected cameras.

Once the location is determined, then the embodiments use the depth map to generate the left passthrough visualization and the right passthrough visualization. As discussed earlier, generating the depth map is performed by identifying all of the corresponding pixels between the transformed left and right images. Once the corresponding pixels of the two images are all identified, then the embodiments calculate the displacement between the coordinates of the pixels in the transformed left image and the pixels in the transformed right image. This displacement is referred to as a "disparity" and is represented by the "d" in the third equation which is produced below. Relatedly, the "$u_l$" and "$u_r$" variables represent the x-coordinates (i.e. horizontal coordinates) of each pixel in the transformed left image and its corresponding pixel in the transformed right image. Accordingly, "d" is the difference in x-coordinates between corresponding pixels in the two images (i.e. the transformed left image and the transformed right image). In other words, d is the computed disparity at $u_l$ (i.e. "d" represents individualized portions of the depth map).

$$d=u_l-u_r$$

Using the fourth equation, which is illustrated below, the left passthrough visualization can then be derived from the transformed left image. In other words, the following equation represents individualized implementations of the depth map to generate individualized portions of the left passthrough visualization.

$$u_l=u'_l+\lambda*d$$

As presented above, $u_l$ is the x-coordinate of pixels in the transformed left image, and $u'_l$ is the x-coordinate of pixels in the left passthrough visualization (i.e. the reprojected image).

Figure 14:
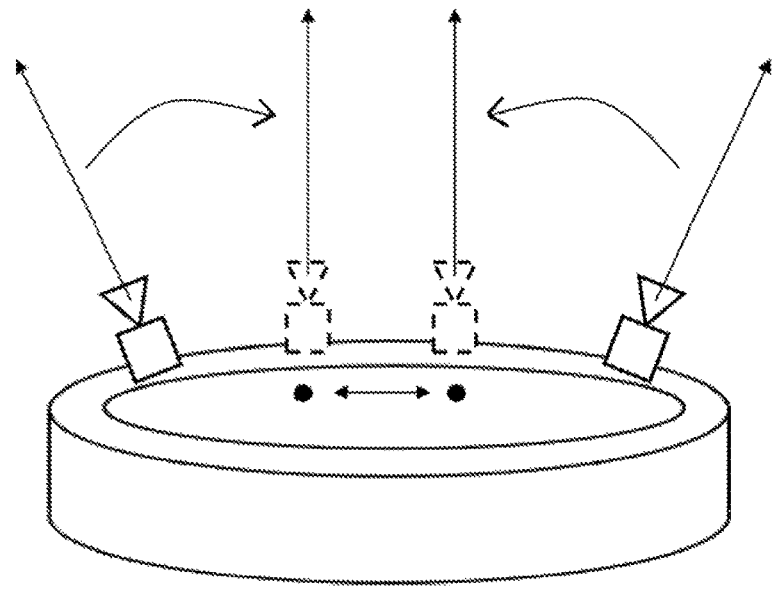
FIG. 14 shows a high-level overview of a combination of many of the processes used to generate a passthrough visualization using existing hardware infrastructure.

Having just described specific details with regard to the current embodiments, attention will now be directed to FIG. 14 which illustrates a high-level overview of principles described herein.

In particular, FIG. 14 shows that two stereo cameras, which are mounted on a HMD, are able to capture raw images of an environment. Using the principles discussed herein, the embodiments perform various transformations on the image data. These transformations alter a center-line perspective of the captured image data. Whereas previously the center-line perspectives were angled outward in relation to each other (as shown generally in FIG. 14), the transformations cause the center-line perspectives of the image data to align in a parallel manner and to become physically closer to each other so as to match the locations and distance of the user's pupils. In other words, the reprojections move and render the transformed left image's center-line perspective "closer" to the transformed right image's center-line perspective.

Figure 15:
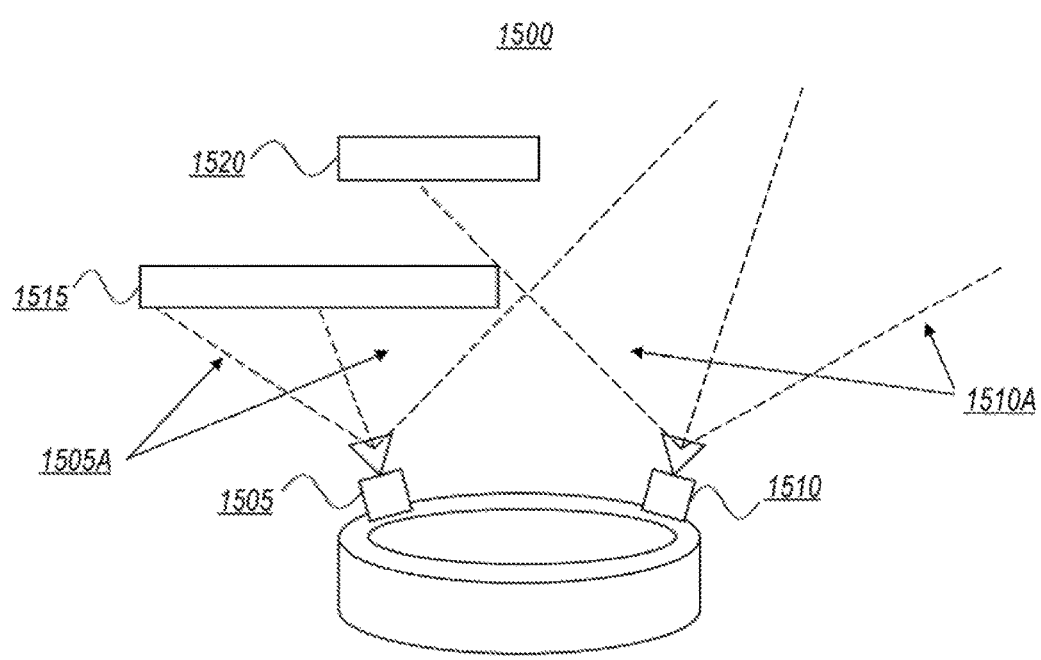
FIG. 15 illustrates an example scenario in which only one camera of a stereo camera pair captures particular content that is uncaptured by the other camera.

Attention will now be directed to FIG. 15 which illustrates an example scenario 1500 that may occur in some situations.

Here, FIG. 15 shows that a head-mounted device includes two stereo cameras, a left camera 1505 having a field of view 1505A and a right camera 1510 having a different field of view 1510A. As shown, the center-line perspectives (not labeled) of the two cameras are not parallel. In scenario 1500, there are two physical objects, object 1515 and object 1520. These objects are real-world objects.

As illustrated, object 1515 is partially blocking the field of view 1505A of the left camera 1505. As a result, the left camera 1505 is not able to view the second object 1520. In contrast, however, the right camera 1510 is able to view the object 1520 because the object 1520 is within the field of view 1510A of the right camera 1510.

When scenarios such as the scenario 1500 are present, only one camera is able to capture images of an obscured, or rather hidden, object (e.g., object 1520). As a result, the depth of the hidden object cannot be calculated in the same manner as described above. Instead, the depth must be estimated because only a single camera image is present. As discussed, two camera images are required in order to properly calculate depth. As a result, when a scenario like scenario 1500 arises, the embodiments must estimate the hidden object's depth.

This estimation can occur in a number of ways. For instance, in some embodiments, the front object (i.e. object 1515) will have its depth coordinates calculated using the principles described above (because both cameras can potentially view that object). Then, these embodiments assign "estimated" depth coordinate values to the hidden object. These estimations are generated using the front object's depth coordinates as an initial baseline and then increasing those depth coordinate values a selected amount to thereby cause the hidden value to be at least partially further back (i.e. deeper) than the front object. The selected value may be any value sufficient to cause the hidden object to appear further back than the front object. Accordingly, in these embodiments, the hidden object is assigned a selected depth coordinate to thereby force it to be at least somewhat further back than the front object.

Other embodiments compensate for scenario 1500 by emphasizing the hidden object in some manner so as to call the user's attention to that object. By calling the user's attention to the object, the user will change his/her orientation so as to allow the second camera to capture images of the hidden object (which results in proper depth calculations being performed). In some instances, the emphasizing may include generating a halo effect around the hidden object (recall that the object is hidden only for one camera so the halo effect may be performed on one passthrough visualization). In other instances, the emphasizing may include highlighting the hidden object. Regardless of what type of emphasizing is used, the purpose of the emphasizing is to cause the user to change his/her position. By changing his/her position, the second camera will be able to properly capture images of the hidden object. Thereafter, the embodiments will be able to generate the hidden object's depth and properly render the passthrough visualizations. Here, it will be appreciated that the above determinations also depend on real-time eye tracking. Accordingly, the outward facing cameras (i.e. the head-tracking cameras) operate in parallel with the eye-facing cameras (i.e. the cameras used to determine the user's interpupil distance) which operates in parallel with the eye-tracking software.

In scenario 1500, the 'hidden' object 1520 may be visually emphasized in an initial passthrough visualization. In this initial passthrough visualization, the object 1520 may not have the correct depth coordinates because only a single camera is being used to capture images of the object 1520. In an effort to generate correct depth coordinates for the object 1520, some embodiments will visually emphasize object 1520. As indicated above, some emphasis techniques may include, but are not limited to, generating a halo effect around the object 1520 or visually highlighting the object 1520. Other emphasis techniques may include generating an arrow on the passthrough visualization pointing to (or away from) the object 1520 to inform the user that he/she needs to move to the side in order to bring the object 1520 into view of both cameras 1505 and 1510. Accordingly, the emphasis techniques described herein are designed to attract the user's attention and to cause the user to move so that the object 1520 may be brought into the view of both cameras.

Exemplary Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These methods are implemented by one or more processors of a computer system (e.g., the computer system 400 of FIG. 4). By way of example, a computer system includes one or more computer-readable hardware storage media that store computer-executable code. This computer-executable code is executable by the one or more processors to cause the computer system to perform these methods.

Figure 16:
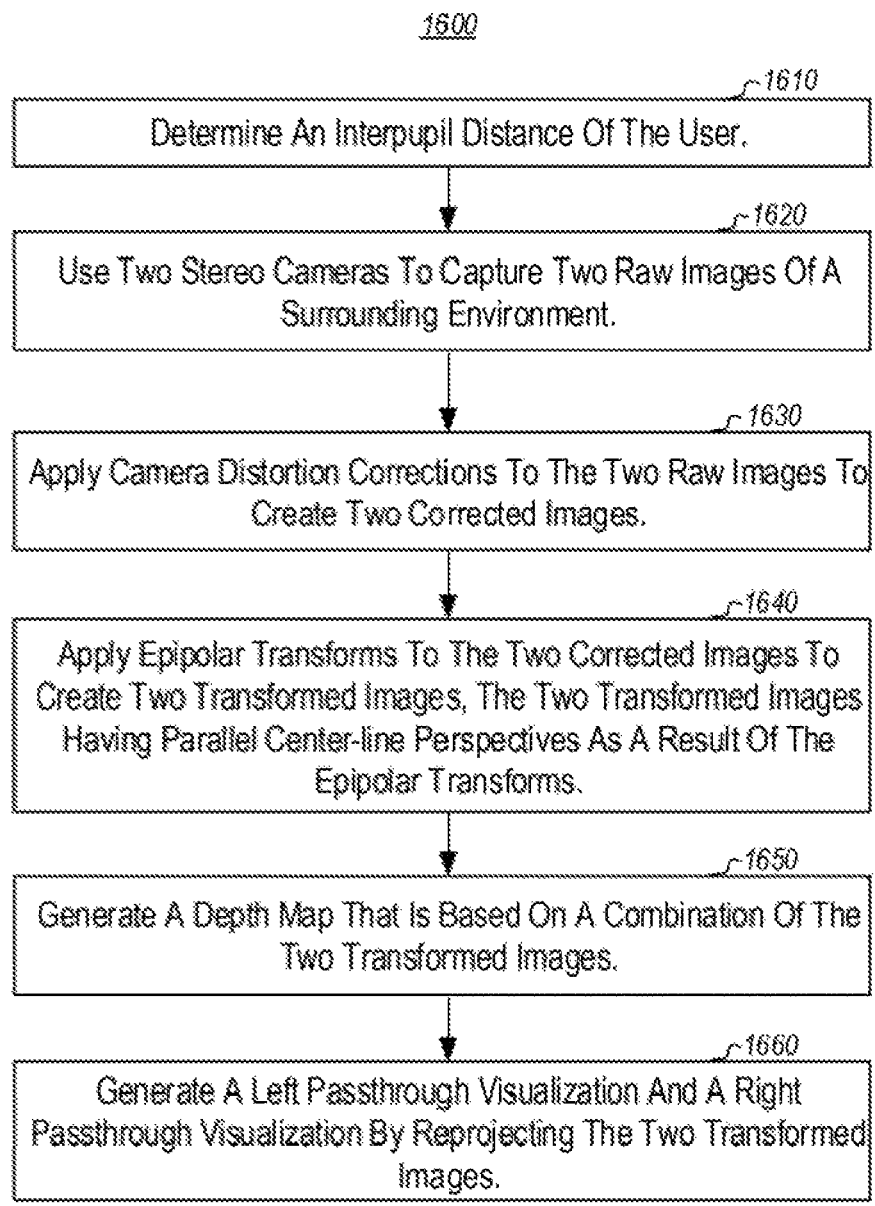
FIG. 16 shows an exemplary method for reconstructing a perspective captured in a camera image so that the captured perspective matches a user's own unique perspective.

FIG. 16 illustrates an exemplary method 1600 for reconstructing a center-line perspective captured by a camera image so that it matches a perspective of a user who is wearing a head-mounted device. Initially, the user's interpupil distance is determined (act 1610). This may be performed by the head tracking component 405 of the computer system 400 shown in FIG. 4. Here, it is worthwhile to note that the interpupil distance may be calculated in a variety of ways. For example, in some instances, the interpupil distance is calculated by one or more of (1) manual measurement and user input, (2) eye-facing cameras (e.g., eye trackers/gaze detectors), or (3) adjustment of display optics. Further, determining the interpupil distance may be performed periodically in real time to compensate and adjust for slight variations in the IPD, such as caused by a user squinting or eye displacement caused by users moving their eyes. As a result, reconstructing the center-line perspective of the image captured by the stereo camera pair may also be performed periodically to match the frequency of the interpupil distance determination.

Next, the stereo cameras are used to capture raw images of the surrounding environment (act 1620). This may also be performed by the head tracking component 405 referenced above. In some embodiments, the two stereo cameras are positioned in a particular alignment so as to capture as much area of the surrounding environment as possible. For instance, a center-line perspective of the left camera (e.g., the center-line perspective 705 shown in FIG. 7) is positioned at an angle with respect to a center-line perspective of the right camera (e.g., the center-line perspective 715 of FIG. 7). This angle causes the two center-line perspectives to be oriented in a non-parallel manner as shown in FIG. 7. Furthermore, in an effort to capture as much area of the surrounding environment as possible, the left camera is at least 7 cm (but may be more, for example, 10.5 cm, 11.0 cm, etc.) distant from the right camera on the head-mounted device.

Next, camera distortion corrections are applied/performed (act 1630) to create two "corrected" images (i.e. a corrected left image and a corrected right image). This is performed by the distortion component 410 of the computer system 400 shown in FIG. 4. In some instances, this correction corrects a lens distortion. Additionally, this correction corrects other distortions associated with the cameras as described previously in relation to FIG. 8.

Epipolar transforms are also applied to the two corrected images (act 1640) to create two "transformed" images (i.e. a transformed left image and a transformed right image).

These two transformed images have parallel center-line perspectives as a result of the epipolar transforms. The epipolar transforms are performed by the epipolar component 415 of the computer system 400. In some instances, the epipolar transforms include a rotation transform, a translation transform, and/or a scaling transform, as discussed previously.

Next, a depth map is generated which maps the distances between the stereo camera pair and objects in the surrounding environment (act 1650). This depth map is based on a combination of the two transformed images and may be generated by the depth map component 420 of the computer system 400.

Finally, the left and right passthrough visualizations are generated (act 1660) by reprojecting the two transformed images using a result obtained from the depth map. The reprojection process causes the transformed left image's center-line perspective to be in alignment with the user's left pupil and the transformed right image's center-line perspective to be in alignment with the user's right pupil. Notably, the result obtained from the depth map is at least partially based on the determined interpupil distance that was calculated previously. As a consequence, this reprojection causes a reduction in a baseline perspective of the stereo camera pair so that the perspective matches the perspective of the user. Similarly, the reprojection causes a center-line perspective captured by the transformed left image to be altered to match a center-line perspective of the user's left eye. Additionally, the reprojection causes a center-line perspective captured by the transformed right image to be altered to match a center-line perspective of the user's right eye. The reprojection process is performed, in some instances, by the reprojection component 425 of the computer system 400.

Figure 17:
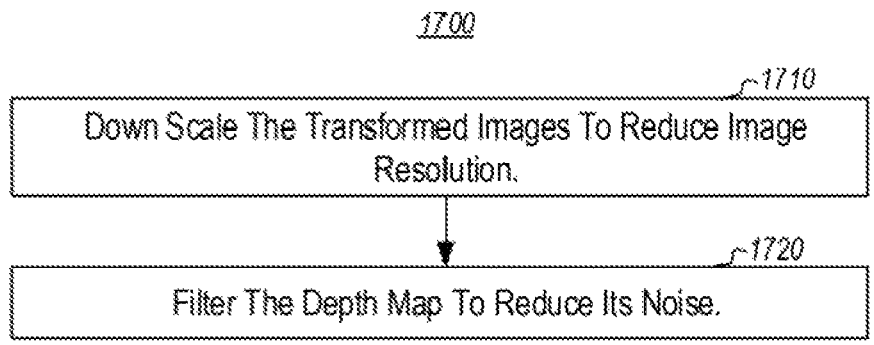
FIG. 17 illustrates various down sampling and filtering method acts.

Additional processing may also be performed in addition to the foregoing processes that are described. For instance, as discussed earlier, the captured images may, in some instances, be down sampled and the depth map may be filtered so as to create a "smooth" depth map. FIG. 17 illustrates an exemplary method 1700 related to these processes.

As shown, method 1700 includes an act of downscaling the transformed images to reduce their image resolutions (act 1710). This may be performed by the depth map component 420 of the computer system 400 and may be performed prior to the generation of the left and right passthrough images. Although act 1710 performs the downscaling on the "transformed" images, it will be appreciated that the downscaling can be performed on the "raw" images or on the "corrected" images.

Additionally or alternatively, method 1700 also includes filtering the depth map to reduce any noise or bad data (act 1720). This may also be performed by the depth map component 420 of the computer system 400 prior to the generation of the left and right passthrough images.

Figure 18:
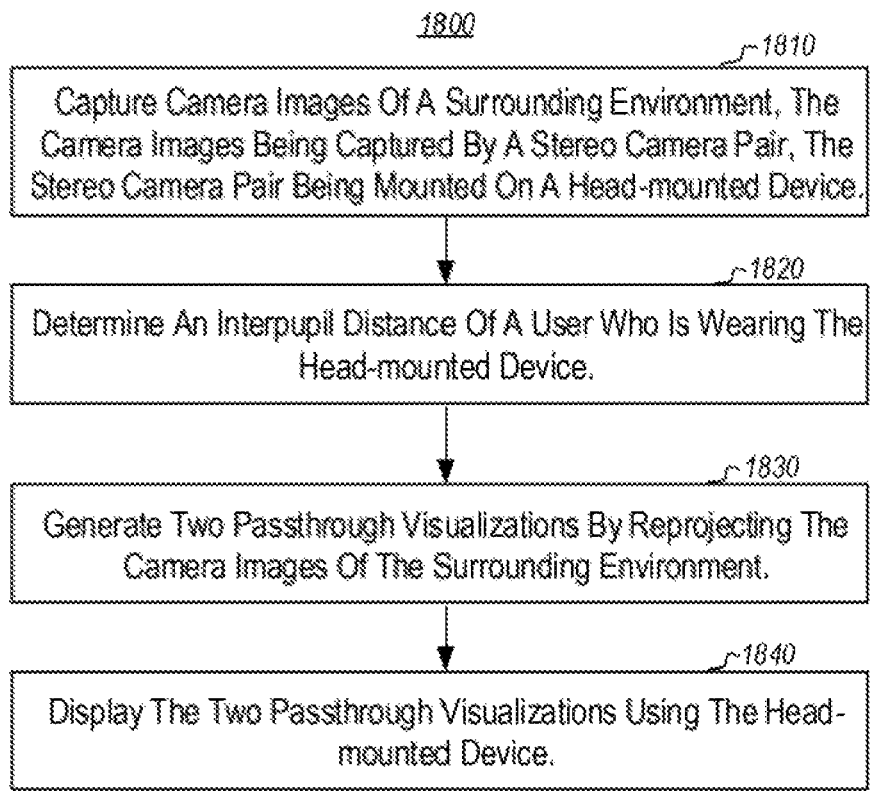
FIG. 18 shows another exemplary method for reconstructing a perspective captured in a camera image so that the captured perspective matches a user's own unique perspective.

Turning now to FIG. 18, an exemplary method 1800 is illustrated for reconstructing a center-line perspective captured by a camera image so that it matches a center-line perspective of the user.

As shown, the camera images of a surrounding environment are captured by a stereo camera pair (act 1810). Notably, the stereo camera pair is mounted on a head-mounted device, such that the image capture is performed by the head tracking component 405 of the computer system 400.

The user's interpupil distance is also determined, before or after capturing the image (act 1820).

Two passthrough visualizations are then generated by reprojecting the camera images of the surrounding environment (act 1830). This may be accomplished with one or more of the distortion component 410, the epipolar component 415, the depth map component 420 and/or the reprojection component 425. In some instances, one or more camera distortion corrections and epipolar transforms are applied to the camera images prior to the images being reprojected.

Finally, the two passthrough visualizations are displayed using the head-mounted device (act 1840), such as can be performed with the reprojection component 425 and the display devices rendering the passthrough visualizations.

Figure 19:
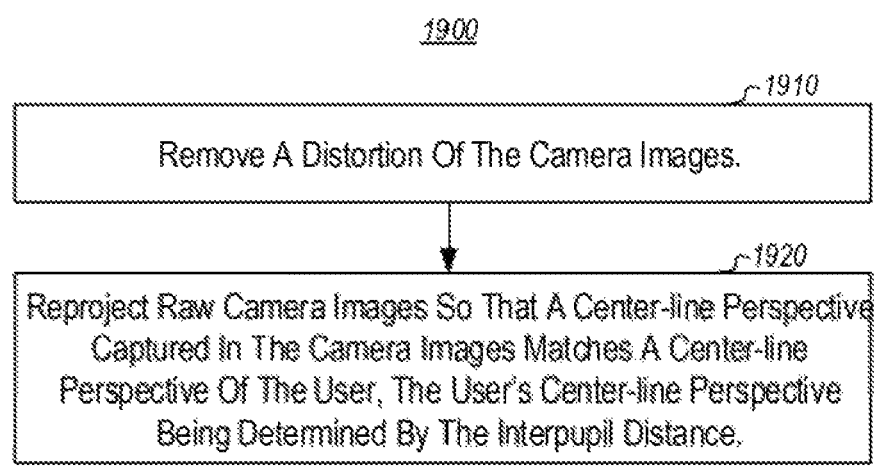
FIG. 19 illustrates additional method acts that may be performed in reconstructing and rectifying an image.

FIG. 19 illustrates a method that illustrates various acts associated with rendering passthrough visualizations that are generated by reprojecting corresponding camera images, corresponding specifically to act 1830 of FIG. 18. More specifically, method 1900 details that act 1830 of method 1800 includes various sub-acts. For example, method 1900 shows that one of these sub-acts includes removing a distortion of the camera images (act 1910), which may be performed by the distortion component 410.

Next, the camera images are reprojected so that a center-line perspective captured in the camera images matches the user's center-line perspective (act 1920). Notably, the user's center-line perspective is determined, at least in part, by the user's interpupil distance. This may be performed by the reprojection component 425.

As should be appreciated from the foregoing, the present embodiments significantly advance the current technology by repurposing existing hardware infrastructure to generate passthrough visualizations that match the user's center-line perspective. This is accomplished even though the original center-line perspectives of the images captured by the existing hardware components do not match the center-line perspectives of the user.

The present embodiments may be embodied in other specific forms without departing from its spirit or characteristics. The described embodiments are to be considered in all respects only as illustrative and not restrictive. The scope of the embodiments is, therefore, indicated by the appended claims rather than by the foregoing description. All changes which come within the meaning and range of equivalency of the claims are to be embraced within their scope.

What is claimed is:

1. A computer system comprising:
   a head-mounted device that includes a stereo camera pair, the stereo camera pair including a left camera and a right camera, the stereo camera pair being used to capture images of a surrounding environment, wherein the left camera includes a center-line perspective and the right camera includes a center-line perspective;
   one or more processors; and
   one or more computer-readable hardware storage devices having stored thereon computer-executable instructions that are executable by the one or more processors to cause the computer system to:
   use the left camera to capture a raw left image of the surrounding environment and use the right camera to capture a raw right image of the surrounding environment;
   apply camera distortion corrections to the raw left and right images to generate a corrected left image and a corrected right image, the corrected left image having a same center-line perspective as the raw left image, the corrected right image having a same center-line perspective as the raw right image;

apply a first digital transform that includes epipolar transforms to the corrected left and right images to generate a transformed left image and a transformed right image, wherein a center-line perspective of the transformed left image is parallel to a center-line perspective of the transformed right image as a result of the epipolar transforms;

generate a depth map that is based on a combination of the transformed left image and the transformed right image; and apply a second digital transform that includes reprojection transforms to the transformed left image and the transformed right image, the second digital transform generating a left passthrough image and a right passthrough image by reprojecting the transformed left image and the transformed right image, the reprojecting being performed using a result obtained from the depth map, the reprojecting causing a center-line perspective of the left passthrough image to be in alignment with a left pupil of a user and a center-line perspective of the right passthrough image to be in alignment with a right pupil of the user.

2. The computer system of claim 1, wherein the epipolar transform includes both a rotation transform and a translation transform.

3. The computer system of claim 1, wherein the left camera is at least 7 centimeters distant from the right camera on the head-mounted device.

4. The computer system of claim 3, wherein the reprojecting the transformed left image causes the left passthrough image to appear as though it was captured by a camera that is both (1) positioned a particular distance in front of the user's left pupil and (2) aligned with a center-line perspective of the user's left pupil.

5. The computer system of claim 1, wherein execution of the computer-executable instructions further causes the computer system to determine an interpupil distance of the user by performing one or more of (1) manual measurement, (2) eye-facing cameras, or (3) adjustment of display optics.

6. The computer system of claim 1, wherein the reprojecting moves the transformed left image's center-line perspective closer to the transformed right image's center-line perspective.

7. The computer system of claim 1, wherein the head-mounted device completely obscures a view of the surrounding environment such that the user is unable to directly view the surrounding environment while wearing the head-mounted device.

8. The computer system of claim 1, wherein the depth map includes three-dimensional coordinates for at least some pixels that were generated from the combination of the transformed left image and the transformed right image.

9. The computer system of claim 1, wherein, prior to the generating the left passthrough image and the right passthrough image, the transformed left image and the transformed right image are both downscaled to reduce image resolution.

10. The computer system of claim 9, wherein, prior to the generating the left passthrough image and the right passthrough image, the depth map is filtered to reduce noise, whereby a smooth depth map is generated as a result of the downscaling and the filtering.

11. One or more hardware storage devices having stored thereon computer-executable instructions, the computer-executable instructions being executable by a computer system that includes a head-mounted device to cause the computer system to reconstruct a perspective captured in images so that the captured perspective matches a perspective of a user who is wearing the head-mounted device by causing the computer system to:

determine an interpupil distance of the user who is wearing the head-mounted device, the head-mounted device including a stereo camera pair, the stereo camera pair including a left camera and a right camera, the stereo camera pair being used to capture images of a surrounding environment, wherein a center-line perspective of one of the images captured by the left camera has a non-parallel alignment with respect to a center-line perspective of one the images captured by the right camera;

use the left camera to capture a raw left image of the surrounding environment and use the right camera to capture a raw right image of the surrounding environment;

apply camera distortion corrections to the raw left and right images to generate a corrected left image and a corrected right image, the corrected left image having a same center-line perspective as the raw left image, the corrected right image having a same center-line perspective as the raw right image;

apply a first digital transform that includes epipolar transforms to the corrected left and right images to generate a transformed left image and a transformed right image, wherein a center-line perspective of the transformed left image is parallel to a center-line perspective of the transformed right image as a result of the epipolar transforms;

generate a depth map that is based on a combination of the transformed left image and the transformed right image; and based on the determined interpupil distance of the user, apply a second digital transform that includes reprojection transforms to the transformed left image and the transformed right image, the second digital transform generating a left passthrough image and a right passthrough image by reprojecting the transformed left image and the transformed right image, the reprojecting being performed using a result obtained from the depth map, the reprojecting causing a center-line perspective of the left passthrough image to be in alignment with a left pupil of the user and a center-line perspective of the right passthrough image to be in alignment with a right pupil of the user.

12. The one or more hardware storage devices of claim 11, wherein the depth map is a smooth depth map, the smooth depth map being generated by both (1) downscaling the transformed left and right images and (2) filtering the depth map.

13. The one or more hardware storage devices of claim 12, wherein the smooth depth map includes three-dimensional coordinates for a plurality of pixels that were generated from the combination of the transformed left and right images, and wherein the smooth depth map excludes depth coordinates for at least one of the plurality of pixels that was included in the depth map.

14. The one or more hardware storage devices of claim 11, wherein the determining the interpupil distance of the user is performed periodically in real time, and wherein the reprojection is performed periodically to match when the interpupil distance is periodically determined.

15. The one or more hardware storage devices of claim 11, wherein the depth map maps distances between the stereo camera pair and objects in the surrounding environment.

16. A method for reconstructing a perspective captured in images so that the captured perspective matches a perspective of a user who is wearing a head-mounted device, the method being implemented by one or more processors of the head-mounted device, the method comprising:
- determining an interpupil distance of the user who is wearing the head-mounted device, the head-mounted device including a stereo camera pair, the stereo camera pair including a left camera and a right camera, the stereo camera pair being used to capture the images of a surrounding environment, wherein a center-line perspective of one of the images captured by the left camera has a non-parallel alignment with respect to a center-line perspective of one the images captured by the right camera;
- using the left camera to capture a raw left image of the surrounding environment and using the right camera to capture a raw right image of the surrounding environment;
- applying camera distortion corrections to the raw left and right images to generate a corrected left image and a corrected right image, the corrected left image having a same center-line perspective as the raw left image, the corrected right image having a same center-line perspective as the raw right image;
- applying a first digital transform that includes epipolar transforms to the corrected left and right images to generate a transformed left image and a transformed right image, wherein a center-line perspective of the transformed left image is parallel to a center-line perspective of the transformed right image as a result of the epipolar transforms;
- generating a depth map that is based on a combination of the transformed left image and the transformed right image; and
- based on the determined interpupil distance of the user, applying a second digital transform that includes a reprojection transform to the transformed left image and the transformed right image, the second digital transform generating a left passthrough image and a right passthrough image by reprojecting the transformed left image and the transformed right image, the reprojecting being performed using a result obtained from the depth map, the reprojecting causing a center-line perspective of the left passthrough image to be in alignment with a left pupil of the user and a center-line perspective of the right passthrough image to be in alignment with a right pupil of the user.

17. The method of claim 16, wherein the stereo camera pair is part of an inside-out tracking camera system.

18. The method of claim 16, wherein the applying the camera distortion corrections corrects a lens distortion of the left camera and the right camera.

19. The method of claim 16, wherein the left camera is at least 7 centimeters distant from the right camera on the head-mounted device.

20. The method of claim 16, wherein the depth map is a smooth depth map, the smooth depth map including three-dimensional coordinates for at least some pixels that were generated from the combination of the transformed left image and the transformed right image, and wherein the smooth depth map excludes at least some depth coordinates for one or more pixels that were included in the depth map.

21. The method of claim 16, wherein the left passthrough image and the right passthrough image are altered images altered to appear as though the left passthrough image and the right passthrough image were captured by simulated cameras located near the left pupil and the right pupil of the user.

* * * * *